US011265772B2

(12) United States Patent
Vaidya et al.

(10) Patent No.: US 11,265,772 B2
(45) Date of Patent: Mar. 1, 2022

(54) METHODS AND APPARATUS FOR SUPPORTING CONDITIONAL HANDOVER

(71) Applicant: Charter Communications Operating, LLC, St. Louis, MO (US)

(72) Inventors: Maulik Vaidya, Escondido, CA (US); Amitav Mukherjee, Elk Grove, CA (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/271,849

(22) Filed: Feb. 10, 2019

(65) Prior Publication Data

US 2020/0260342 A1 Aug. 13, 2020

(51) Int. Cl.
*H04W 36/00* (2009.01)
*H04W 36/08* (2009.01)

(52) U.S. Cl.
CPC ....... *H04W 36/0061* (2013.01); *H04W 36/08* (2013.01)

(58) Field of Classification Search
None
See application file for complete search history.

(56) References Cited

U.S. PATENT DOCUMENTS

| | | | | |
|---|---|---|---|---|
| 2010/0216479 A1* | 8/2010 | Kato | ................ | H04W 74/0833 455/450 |
| 2010/0240367 A1* | 9/2010 | Lee | .................... | H04W 36/0077 455/435.2 |
| 2011/0164593 A1* | 7/2011 | Huet | ................ | H04W 36/0055 370/333 |
| 2015/0327127 A1* | 11/2015 | Centonza | .......... | H04W 36/0055 455/436 |
| 2016/0323763 A1* | 11/2016 | Xu | ........................ | H04W 76/28 |
| 2019/0223073 A1* | 7/2019 | Chen | ..................... | H04W 76/18 |
| 2019/0380067 A1* | 12/2019 | Rosa | ................ | H04W 36/0072 |
| 2019/0387440 A1* | 12/2019 | Yiu | ................... | H04W 36/0072 |
| 2020/0187069 A1* | 6/2020 | Hong | ................ | H04W 36/0061 |

* cited by examiner

*Primary Examiner* — Ajit Patel
*Assistant Examiner* — Pamit Kaur
(74) *Attorney, Agent, or Firm* — Straub & Straub; Michael P. Straub; Stephen T. Straub

(57) ABSTRACT

Methods and apparatus used to facilitate preparation of one or more target base stations for possible UE handoffs, e.g., conditional handoffs, which may or may not occur depending on whether or not various handoff conditions are satisfied are described. A handoff message, e.g., a conditional handoff message, including a validity time is generated and sent to each selected target base stations to which a UE may be handed off. The validity time indicates to the target base station a time window, e.g., a time duration for which the handoff target message is to be considered valid. In response to the handoff message, the target base station, receiving the handoff message, allocates resources to the UE and starts a countdown validity timer based on the indicated length of the validity time. When the validity timer expires without handoff to the target base station, the target base station releases the allocated resources.

16 Claims, 20 Drawing Sheets

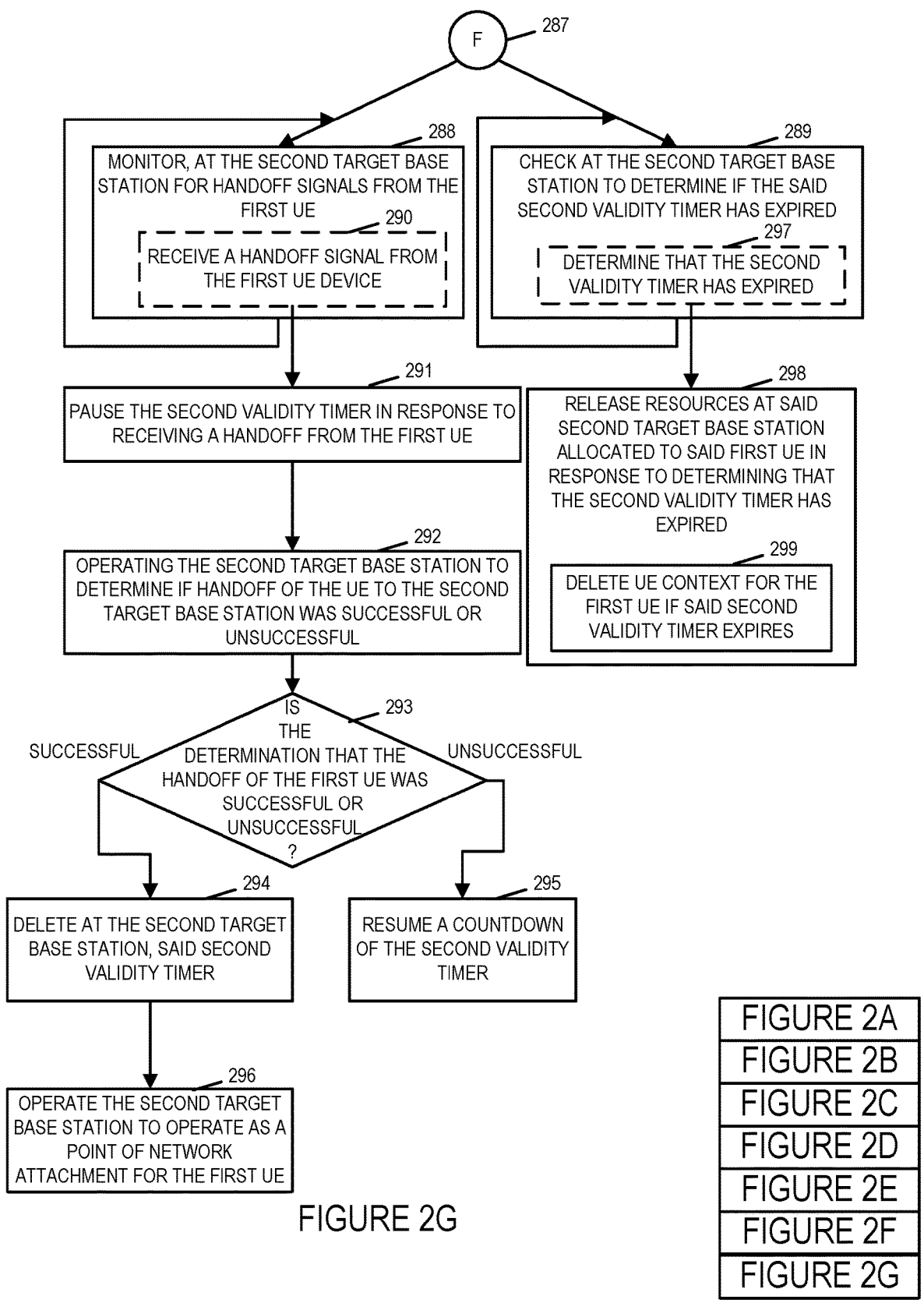

| TIME DURATION DETERMINATION TABLE FOR DETERMINING A VALIDITY TIME TO BE INCLUDED IN A HANDOFF MESSAGE, E.G., A CONDITIONAL HANDOFF MESSAGE, SAID DETERMINED VALIDITY TIME TO BE USED BY A TARGET BASE STATION TO SET A VALIDITY TIMER | | | |
|---|---|---|---|
| UE LOADING LEVEL OF TARGET BASE STATION | PRIORITY LEVEL OF UE, E.G., FIRST UE, BEING HANDED OVER TO TARGET BASE STATION | TYPE OF DATA BEING COMMUNICATED TO OR FROM UE, E.G., FIRST UE, BEING HANDED OVER TO TARGET BASE STATION | DETERMINED VALIDITY TIME, WHERE T1>T2>T3>T4 |
| LOAD LEVEL 1 (E.G., 0 ≤ # UEs ≤ 5) | PRIORITY LEVEL 1 (HIGH PRIORITY) | TRAFFIC PRIORITY LEVEL 1 DATA (HIGH PRIORITY VOICE DATA) | T1 |
| LOAD LEVEL 1 (E.G., 0 ≤ # UEs ≤ 5) | PRIORITY LEVEL 1 (HIGH PRIORITY) | TRAFFIC PRIORITY LEVEL 2 DATA (LOW PRIORITY BEST EFFORT DATA) | T2 |
| LOAD LEVEL 1 (E.G., 0 ≤ # UEs ≤ 5) | PRIORITY LEVEL 2 (LOW PRIORITY) | TRAFFIC PRIORITY LEVEL 1 DATA (HIGH PRIORITY VOICE DATA) | T2 |
| LOAD LEVEL 1 (E.G., 0 ≤ # UEs ≤ 5) | PRIORITY LEVEL 2 (LOW PRIORITY) | TRAFFIC PRIORITY LEVEL 2 DATA (LOW PRIORITY BEST EFFORT DATA) | T3 |
| LOAD LEVEL 2 (# UEs > 5) | PRIORITY LEVEL 1 (HIGH PRIORITY) | TRAFFIC PRIORITY LEVEL 1 DATA (HIGH PRIORITY VOICE DATA) | T2 |
| LOAD LEVEL 2 (# UEs > 5) | PRIORITY LEVEL 1 (HIGH PRIORITY) | TRAFFIC PRIORITY LEVEL 2 DATA (LOW PRIORITY BEST EFFORT DATA) | T3 |
| LOAD LEVEL 2 (# UEs > 5) | PRIORITY LEVEL 2 (LOW PRIORITY) | TRAFFIC PRIORITY LEVEL 1 DATA (HIGH PRIORITY VOICE DATA) | T3 |
| LOAD LEVEL 2 (# UEs > 5) | PRIORITY LEVEL 2 (LOW PRIORITY) | TRAFFIC PRIORITY LEVEL 2 DATA (LOW PRIORITY BEST EFFORT DATA) | T4 |

FIGURE 11

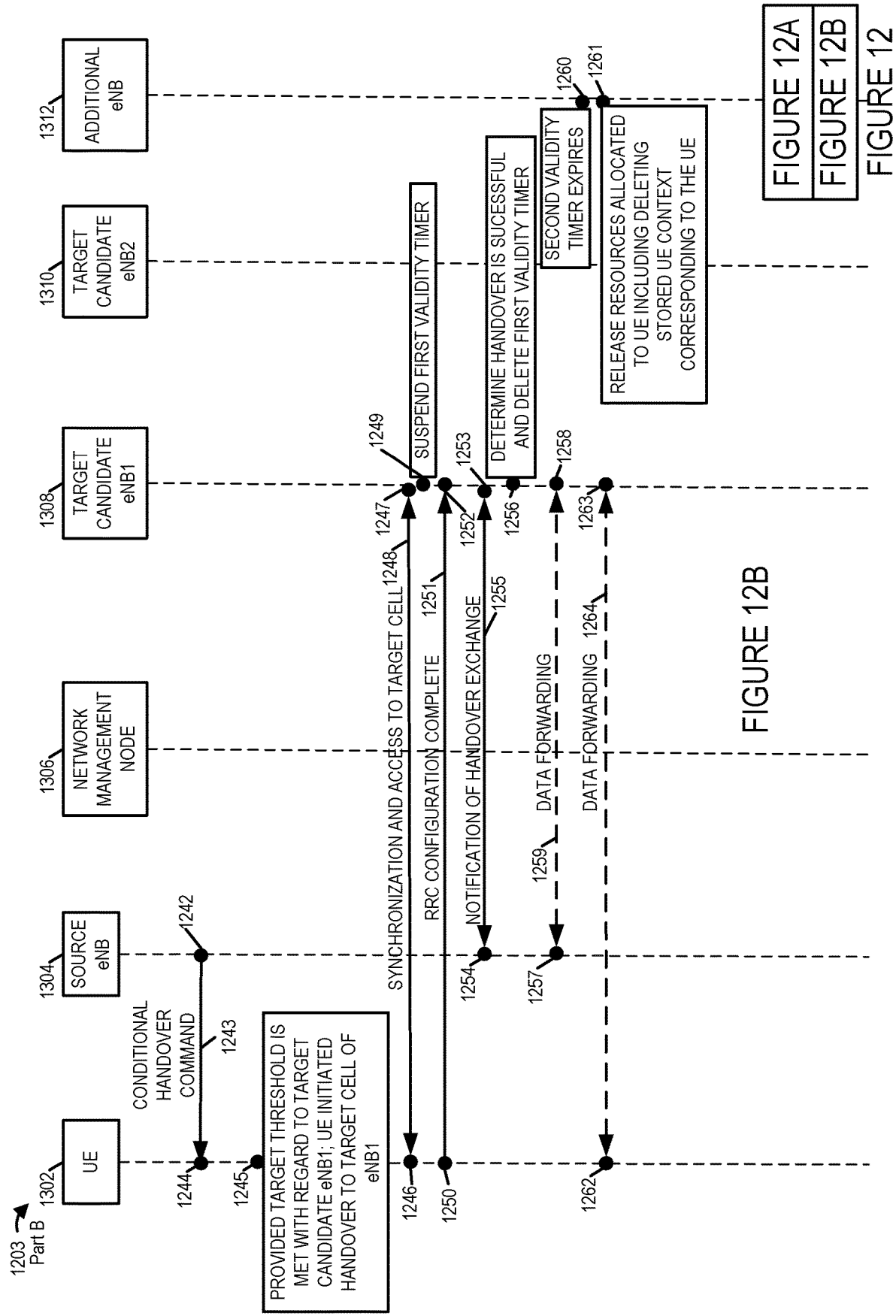

1350 →

| IE/GROUP NAME | PRESENCE | RANGE | IE TYPE AND REFERENCE |
|---|---|---|---|
| ConditionalHandoverValidity | M | | INTEGER (1... maxTimeforCHOValidity, ....) |

1352 →

| RANGE BOUND | EXPLANATION |
|---|---|
| maxTimeforCHOValidity | Maximum time in ms for which Conditional Handover context remains valid. Maximum value is 10000. A default value is not assumed. |

METHODS AND APPARATUS FOR SUPPORTING CONDITIONAL HANDOVER

FIELD

The present application relates to communications methods and apparatus, and more particularly, to conditional handover related methods and apparatus.

BACKGROUND

Wireless communications systems continue to include more small cells. With the inclusion of many additional small cells in a wireless communications system, the need for efficient handover becomes more important, since the amount of handover between base stations is expected to increase. Basics of LTE Handover are discussed in Section 10.1.2.1 3rd Generation Partnership Project (3GPP) document 3GPP TS 36.300 V8.3.0 dated Dec. 12, 2007.

Possible conditional handover which is a relatively new concept is discussed in 3GPP 3GPP TSG RAN meeting #81 document RP-181544 (Sep. 10-13, 2018).

In the case of a conditional handover a source eNB could prepare multiple target eNBs for conditional handover on a per UE basis. Consider a simple example in which 10 UEs are connected to the source eNB. Consider that the source eNB decides to perform conditional handover to the same 5 target eNBs for each UE. Assume that such signaling spans at least 2 messages (a Conditional Handover Request message from source eNB to target eNB, and a Response message from the target eNB to source eNB). The total number of message exchanges for 10 UEs=10×5×2=100.

The UE will most likely end up only in one of the target eNBs. Because the target cell and corresponding target eNB to which the UE eventually lands in is not known at the time of Conditional Handover preparation, a mechanism is needed to remove unused resources on target eNBs which don't eventually end up serving the UE. If a signaling method is chosen such that all of the target eNBs which were identified as possible candidates for UE's conditional Handover were to inform the source eNB, after a predetermined time, of resource relinquishing, the total number of messages exchanged for a single UE would be: (5-1)×2=8, and for 10 UEs would be (5-1)×2×10=80. If we assume that all of the 10 eNBs identified by the source eNB as target eNBs for a given UE share neighbor relationships with each other, then the number of additional signaling messages, and associated processing, required to allow Conditional Handover for UEs on each of those eNBs becomes rather large.

Based on the above discussion, there is a need for new methods and apparatus for supporting context cleanup, e.g. removing unused resources on target eNBs which don't eventually end up serving the UE, when using conditional handover. It would be advantages if at least some of the new methods facilitate context cleanup with regard to conditional handover without adding high levels of overhead signaling.

SUMMARY

Methods and apparatus which can be used to facilitate preparation of one or more target base stations for possible UE handoffs, e.g., conditional handoffs, which may or may not occur depending on whether or not various handoff conditions are satisfied are described.

In various embodiments, a handoff message is generated and sent to a set of target base stations to which a UE may be handed off. In response to the handoff message, sometimes referred to as a conditional handoff message since a handoff is not guaranteed, the target base station receiving the conditional handoff message will allocate resources to the UE that the handoff message indicates may be handed off to the target base station. The resources allocated by the target UE can and sometimes does include storage resources for storing, e.g., context information corresponding to the UE and/or communications resources such as frequency and/or time resources for uplink transmissions.

In accordance with some embodiments, a validity time is included in the handoff message. The validity time indicates to the target base station a time window, e.g., a time duration for which the handoff target message is to be considered valid. The time duration may be and, sometimes is, expressed as a number of milliseconds. In response to the handoff message, the target base station receiving the handoff message will allocate resources to the UE which may be handed off and start a countdown validity timer based on the indicated length of the validity time. If the target base station detects expiration of the validity timer prior to the UE, to which the resources were allocated, sends a handoff signal to the target base station to proceed with the possible handoff, the allocated resources are released without the need for a release message being communicated by the serving base station or a target base station to which the handoff is completed. The term handoff signal in the present application includes, limited to, one or more of a PRACH preamble transmission with the PRACH mask specified by it, or MsgA (for 2-step RACH) or Msg3 (for regular CBRA or CFRA) transmission containing the C-RNTI of the UE for which resources have been reserved. PRACH signaling is discussed in 3rd Generation Partnership Project (3GPP) documents 3GPP TS 38.213 v15.4.0, December 2018, see Section 8 and 3GPP document 3GPP TS 38.321 v15.4.0, December 2018, see Section 5.1 both of which are hereby incorporated by reference in their entirety.

It should be appreciated that handoff signals include one or more signals which can be used by a UE to access a base station. Thus through the use of such signals and/or additional signals a UE may proceed with switching its point of attachment from one base station to another, e.g., as part of a handoff.

The inclusion of a validity time in a handoff message and its use with regard to release of resources by a target base station allows for resources to be released without the need for multiple release messages. This can be particularly beneficial where multiple target base stations are prepared, given that each target base station to which a handoff is not completed can release and reuse the resources allocated to support the possible handoff without the overhead of release messages having to be sent to the target base stations.

The validity time may, and in some embodiments does, depend on UE related factors such as the priority level of the UE device to which the handoff message relates, the type of traffic and thus the priority of the traffic being communicated by the UE device involved in the handoff and/or the amount of traffic to be transmitted to or from the UE involved in the potential handoff. Higher device priority results in the serving base station specifying a longer validity time in some embodiments. Similarly a higher data traffic priority, e.g., due to the data corresponding to voice traffic rather than best effort data traffic can, and sometimes does, result in a longer validity time than when the traffic is lower priority, e.g., best effort traffic. A large amount of data to be communicated to or from the UE also results in a longer validity time in some embodiments than a smaller amount of data. Thus in general the serving base station will provide a longer validity time when a higher priority level or Quality of Service (QOS) is to be provided than when a lower priority level or QOS is to be provided to a UE to which the handoff message relates.

While the same validity timer value can be communicated in handoff messages sent to different target base stations, in some embodiments the duration of a handoff timer is based, at least in part, on factors or conditions relating to the target base station such as load on the target base station. Loading on target base stations may be communicated to serving base stations by a network device, e.g., a SON device, responsible for collecting and providing loading information to various network components. By setting the validity time to a shorter duration in handoff messages sent to heavily loaded target base stations than less heavily loaded target base stations, resources allocated to a UE for a possible handoff will be reallocated more quickly than at the less heavily loaded target base stations. This reflects the fact that it can be beneficial to free up resources for reuse more quickly at base stations which are heavily loaded and thus where the resources are likely to be used if released than at base stations which are less heavily loaded and the released resources may not be needed by another UE and it could thus be beneficial to keep them allocated to a UE that may be handed off to the lightly loaded base station.

In order to allow for successful handoff even if a base station that has a validity timer active for a UE, in some embodiments the base station receiving a handoff signal from a UE, with which a handoff validity timer is associated will pause the corresponding validity timer in response to the handoff signal from the UE to which the validity timer corresponds. The handoff signal from the UE may be, and sometimes is, in the form of a connection request or random access transmission. In this way a UE can complete a handoff even if the validity timer at the contacted base station was about to expire. In the event that the UE sending a handoff signal to a target base station fails to successful complete the handoff it attempts via the signal to the target base station, upon detecting the failure of the attempted handoff the target base station that paused the validity timer corresponding to the UE that failed the handoff attempt will resume the validity timer count down, e.g., stop the pause operation. In the event that a UE for which a handoff validity timer has been set completes a successful handoff the handoff validity timer corresponding to the UE which completed the successful handoff will be deleted allowing the UE to continue to use the resources allocated to it at the target base station to which the handoff has been completed to obtain service from the target base station to which the UE completes the handoff.

Resources allocated to a UE as part of a conditional handoff that can be released can include memory used to store UE context, e.g., security, access control and/or communications session information relating to the UE identified in a handoff message which included a handoff validity time.

By allowing different validity time values to be communicated to different base stations and allowing for the release of resources based on expiration of the handoff validity timer set at different base stations, efficient use of resources at individual base stations can be achieved without the need for a large amount of handoff related signaling to release resources allocated for a potential handoff.

The methods and apparatus of the invention are well suited for preparing groups of base stations, e.g., femto or pico base stations for a handoff where the target base station is somewhat uncertain and/or the handoff may not be completed because of the handoff being conditional on one or more rules that may be communicated to the UE to which a handoff message relates.

The methods and apparatus allows groups of base stations to allocate and prepared for a handoff which may not occur without a large amount of overhead or signaling being needed to release the resources allocated by the different base stations to facilitate the possible handoff.

An exemplary communications method, in accordance with some embodiments, comprises: determining at a serving base station (e.g., a serving base station serving a first UE) a set of handoff targets for a first user equipment (UE) receiving service from the serving base station, said set of handoff targets including a first target base station; generating, at the serving base station, a first handoff message including a first validity time; and sending, from the serving base station, the first handoff message to said first target base station. An exemplary communications system, in accordance with some embodiments, comprises: a serving base station including a first processor, said first processor configured to: determine at the serving base station (e.g., a serving base station serving a first UE) a set of handoff targets for a first user equipment (UE) receiving service from the serving base station, said set of handoff targets including a first target base station; generate, at the serving base station, a first handoff message including a first validity time; and operate the serving base station to send, from the serving base station, the first handoff message to said first target base station.

While various features discussed in the summary are used in some embodiments it should be appreciated that not all features are required or necessary for all embodiments and the mention of features in the summary should in no way be interpreted as implying that the feature is necessary or critical for all embodiments.

Numerous variations on the above described methods and apparatus are described in the detailed description which follows.

BRIEF DESCRIPTION OF THE FIGURES

FIG. 2G is a seventh part of a flowchart of an exemplary communications method in accordance with an exemplary embodiment.

FIG. 2 comprises the combination of FIG. 2A, FIG. 2B, FIG. 2C, FIG. 2D, FIG. 2E, FIG. 2F and FIG. 2G.

FIG. 11 is a drawing of yet another exemplary time duration determination table, used by a serving base station to determine a validity time, to be communicated to a target base station in a handoff message, e.g. a conditional handoff message, said validity time to be used to set a validity timer in the target base station, said time duration being determined based on: i) the UE loading level at the target base station, ii) the priority level of the UE device being handed over and iii) the type of traffic data being communicated to or from UE device being handed over, in accordance with an exemplary embodiment.

FIG. 12B is a second part of a signaling diagram illustrating exemplary conditional handover including the use of conditional handover timers in accordance with an exemplary embodiment.

FIG. 12 comprises the combination of FIG. 12A and FIG. 12B.

FIG. 13 includes exemplary tables which are used to describe a novel information element which may be, and sometimes is, included in a handover message, e.g., a novel conditional handover request message, in accordance with an exemplary embodiment.

DETAILED DESCRIPTION

Figure 1:
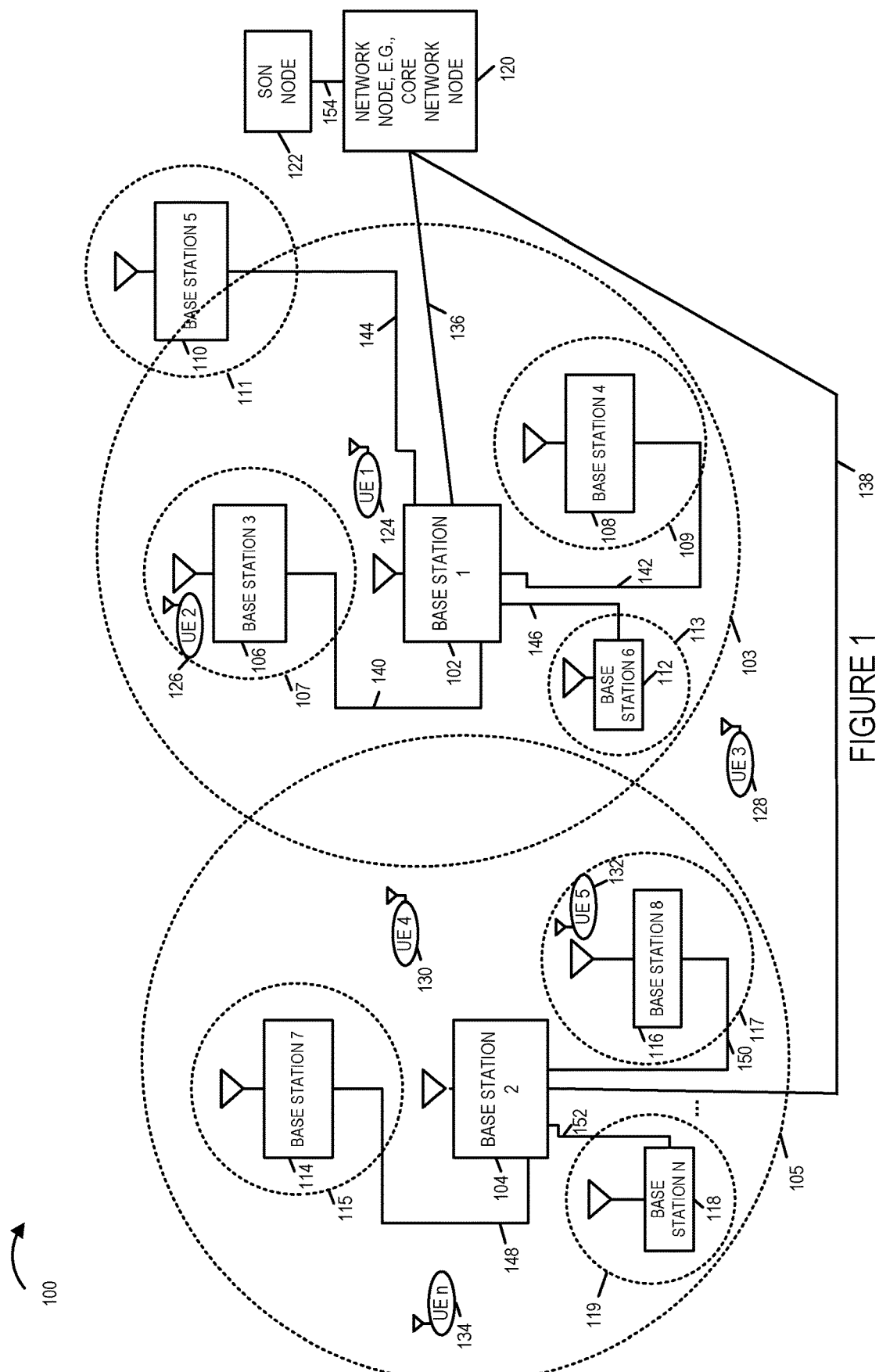
FIG. 1 is a drawing of an exemplary communications system in accordance with an exemplary embodiment.
Figure 2A:
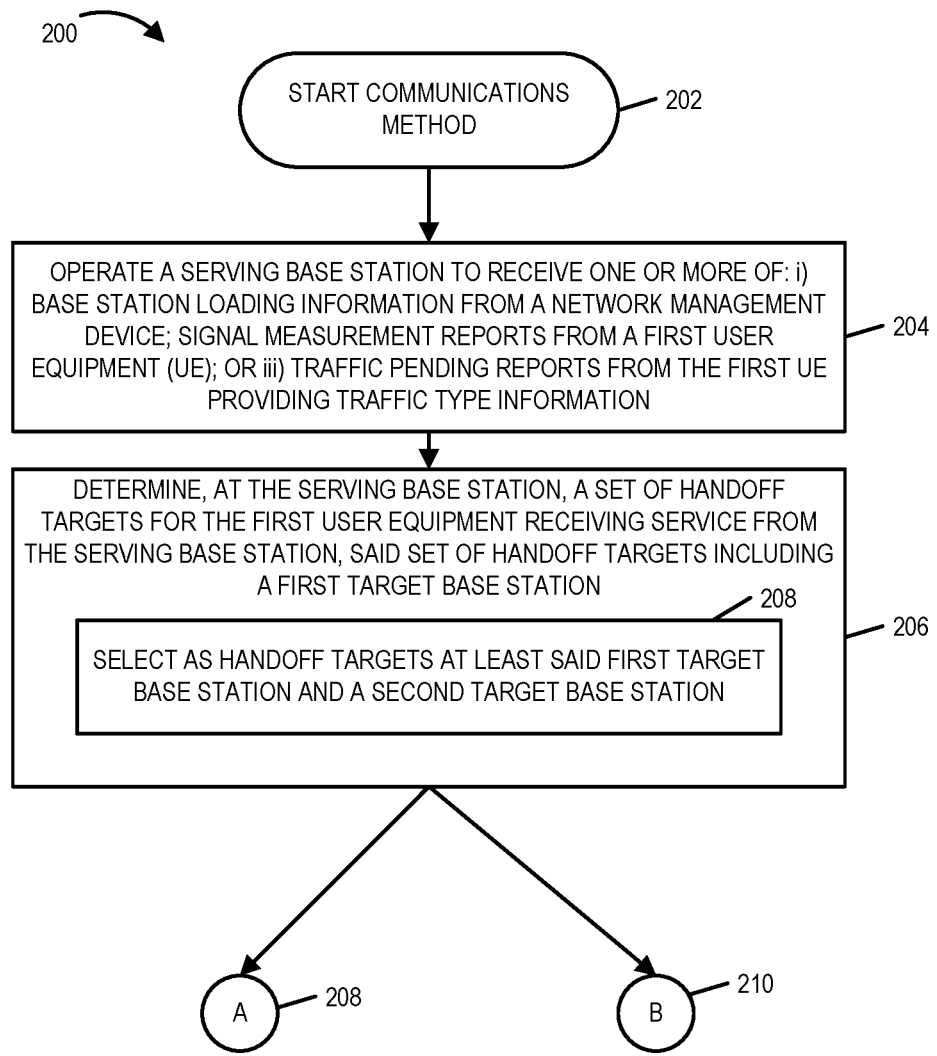
FIG. 2A is a first part of a flowchart of an exemplary communications method in accordance with an exemplary embodiment.
Figure 2B:
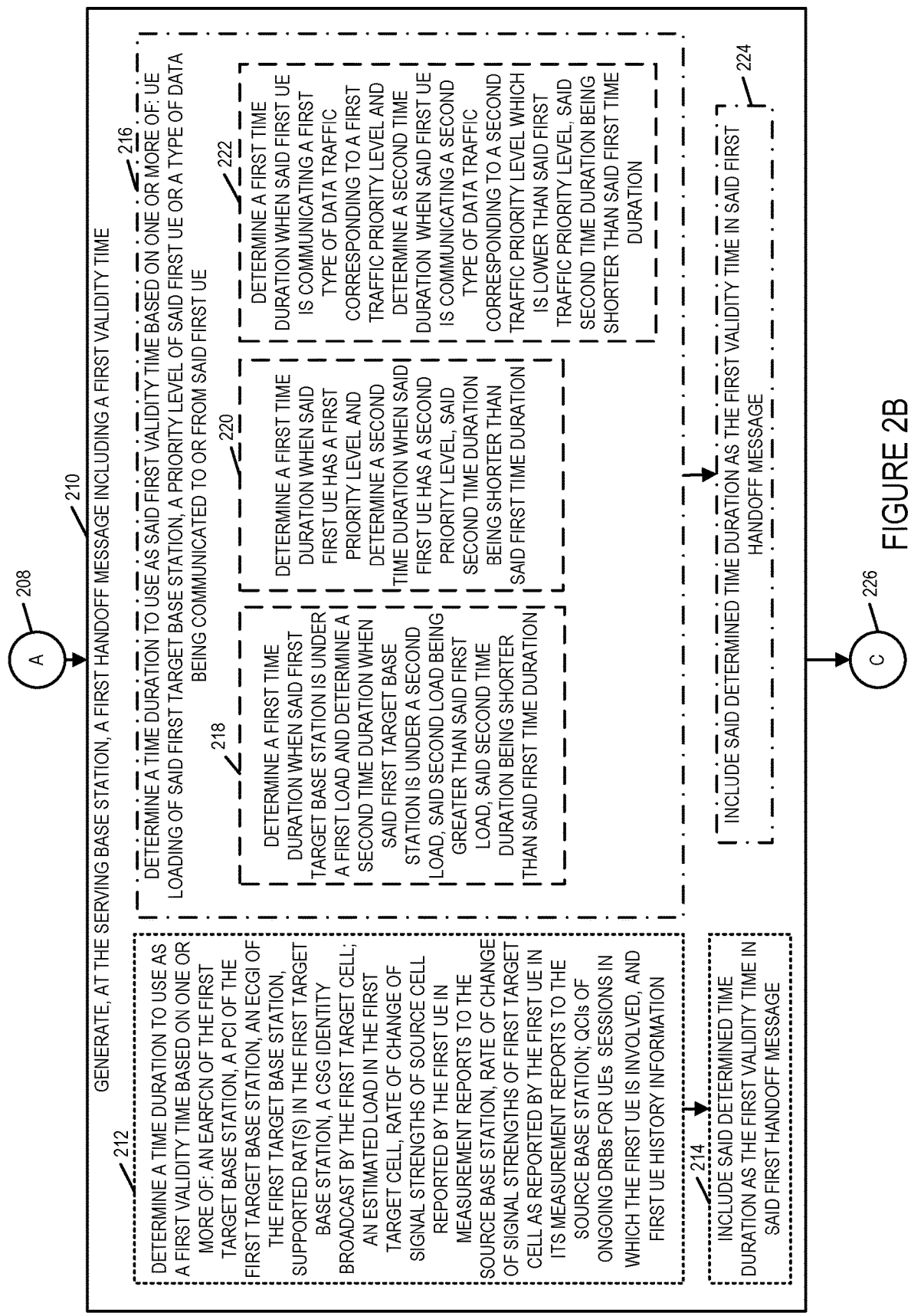
FIG. 2B is a second part of a flowchart of an exemplary communications method in accordance with an exemplary embodiment.
Figure 2C:
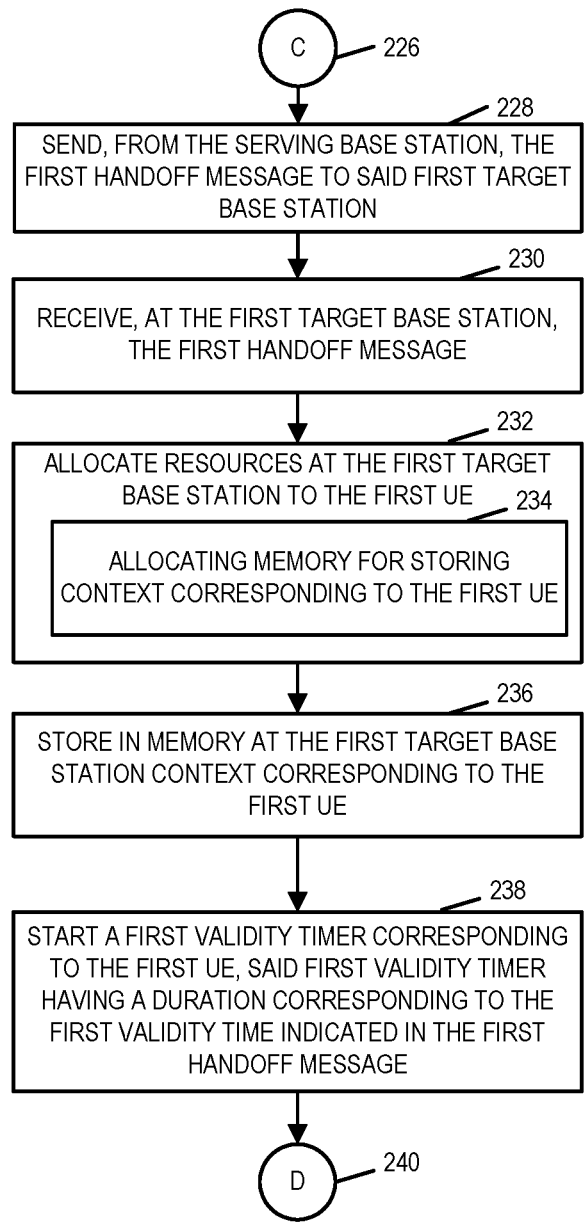
FIG. 2C is a third part of a flowchart of an exemplary communications method in accordance with an exemplary embodiment.
Figure 2D:
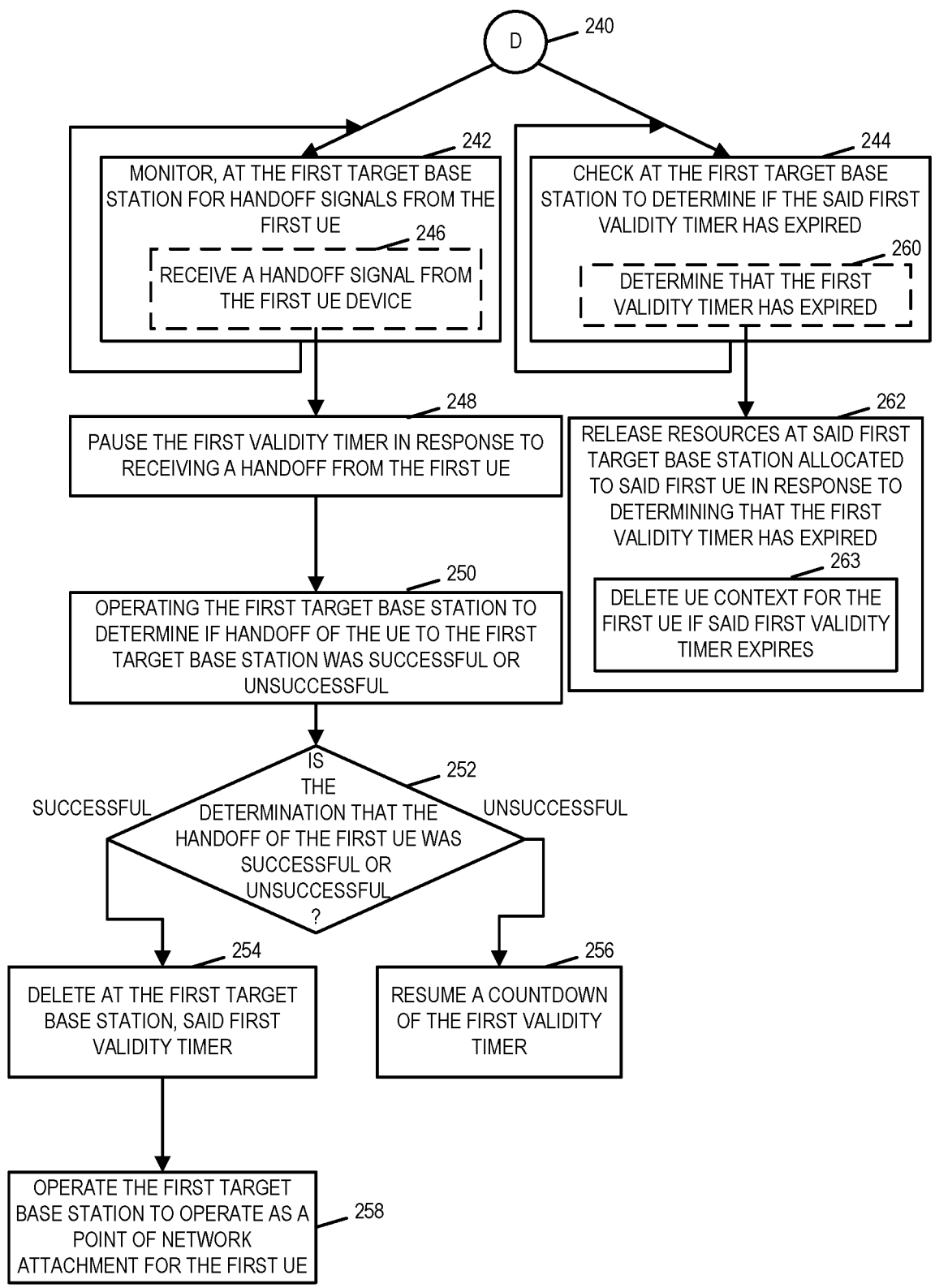
FIG. 2D is a fourth part of a flowchart of an exemplary communications method in accordance with an exemplary embodiment.
Figure 2E:
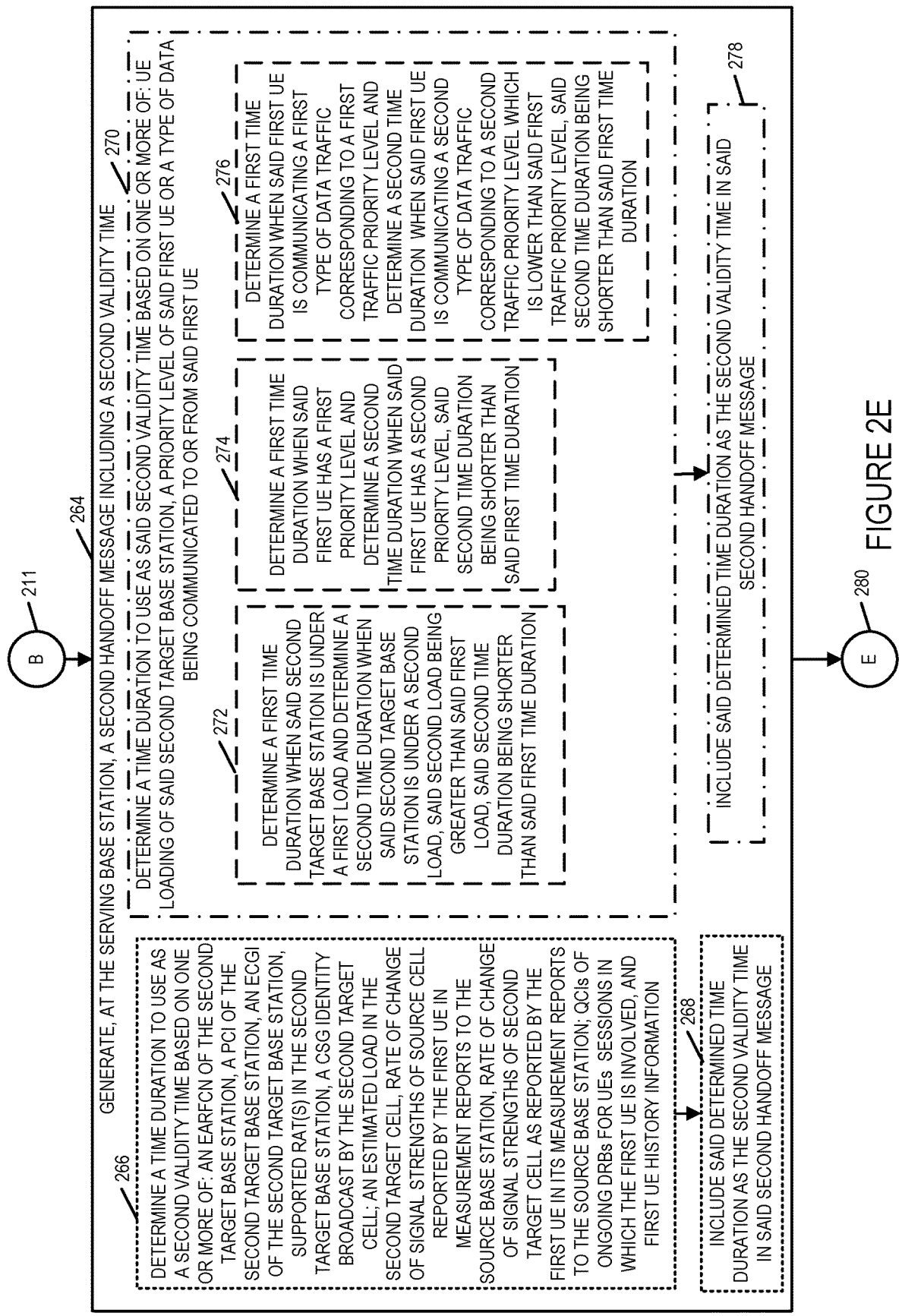
FIG. 2E is a fifth part of a flowchart of an exemplary communications method in accordance with an exemplary embodiment.
Figure 2F:
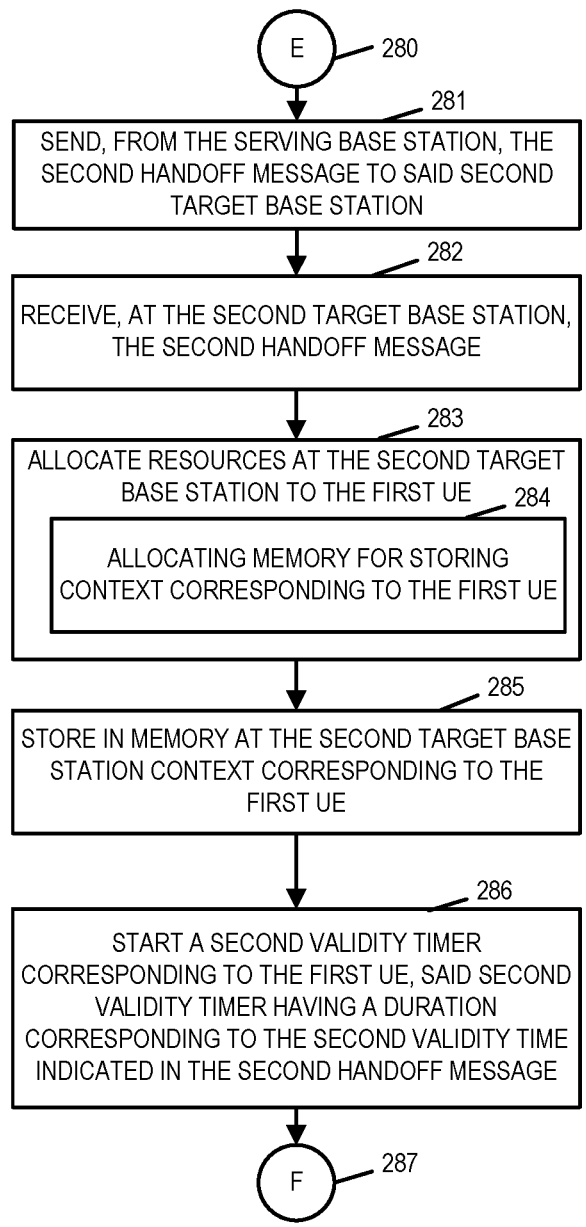
FIG. 2F is a sixth part of a flowchart of an exemplary communications method in accordance with an exemplary embodiment.

FIG. 1 is a drawing of an exemplary communications system 100 in accordance with an exemplary embodiment. Exemplary communications system 100 includes a plurality of base stations (base station 1 102, base station 2 104, base station 3, 106, base station 4 108, base station 5 110, base station 6 112, base station 7 114, base station 8 116, . . . , base station N 118), each with a corresponding wireless coverage area (103, 105, 107, 109, 111, 113, 115, 117, . . . , 119), and a network node 120, e.g., a core network node, coupled together as shown in FIG. 1. Exemplary communications system 100 further includes a plurality of user equipment devices (UE 1 124, UE 2 126, UE 3 128, UE 4 130, UE 5 132, . . . , UE n 134). At least some of the UEs (124, 126, 128, 130, 132, . . . , 134) are mobile devices which may move throughout the communications system, and be handed off between different base stations. The terms handoff and handover are used interchanably in the present application. In some embodiments, the communications system 100 further includes a self-organized network (SON) node 122 coupled to network node 120 via communications link 154.

Base station 1 102 is coupled to network node 120 via communications link 136. Base station 2 104 is coupled to network node 120 via communications link 138. Base station 3 106 is coupled to base station 1 102 via communications link 140. Base station 4 110 is coupled to base station 1 102 via communications link 142. Base station 5 110 is coupled to base station 1 102 via communications link 144. Base station 6 112 is coupled to base station 1 102 via communications link 146. Base station 7 114 is coupled to base station 2 104 via communications link 148. Base station 8 116 is coupled to base station 2 104 via communications link 150. Base station N 118 is coupled to base station 2 104 via communications link 152. In some embodiments, one or more or all of BSs (BS 3 106, BS 4 108, BS 5 110, BS 6 112, BS 7 114, BS 8 116, . . . , BS N 118) are coupled to network node 120 via a communications path that does not traverse another base station.

In some embodiments, base station 1 102 and base station 2 104 are large cell base stations and base station (BS 3 106, BS 4 108, BS 5 110, BS 6 112, BS 7 114, BS 8 116, . . . , BS N 118) are small cell base stations, e.g., femto or pico cell base stations.

In one example, a UE device being served by serving base station 1 102 may be, and sometimes is, handed off to one of a selected set of a plurality target base stations. Prior to handoff the selected set of a plurality of target base stations are prepared for possible handover, e.g., to facilitate a rapid handover.

For example, the selected set of the plurality target base stations is selected from among base stations (106, 108, 110 and 110). In one example, the device to be handed off is UE 1 124, which is being served by large cell base station 1 102, and the selected set of target base station includes base station 3 106 and base station 4 108. Base station 1 102, which is the serving BS for UE 124, generates and sends a first handoff message to base station 3 106 including a first validity time, and base station 1 102, also generates and sends a second handoff message to base station 4 108 including a second validity time, wherein the first and second validity time values may be, and sometimes are different. Base station 3 receives the first handoff message, recovers the first validity time and uses it to set a first validity timer, e.g., a countdown timer. Base station 4 receives the second handoff message, recovers the second validity time and uses it to set a second validity timer, e.g., a countdown timer. The validity timer are used to determine when to release resources if the handover does not occur to that particular target base station, e.g., the target base station deletes stored UE context if its validity timer expires. This approach allows for efficient context cleanup.

FIG. 2, comprising the combination of FIG. 2A, FIG. 2B, FIG. 2C, FIG. 2D, FIG. 2E, FIG. 2F and FIG. 2G, is a flowchart 200 of an exemplary communications method in accordance with an exemplary embodiment. Operation of the exemplary starts in step 200, in which a communications system including a plurality of base stations and a plurality of UE devices is powered on and initialized, and proceeds to step 204.

In step 204 a serving base station is operated to receive one or more or all of: i) base station loading information from a network management device, e.g., a SON device; signal measurement reports from a first user equipment (UE) or iii) traffic pending reports from the first UE providing traffic type information. Operation proceeds from step 204 to step 206.

In step 206 the serving base station, e.g., a serving base station serving a first UE, determines a set of handoff targets for the first user equipment receiving service from the serving base station, said set of handoff targets including a first target base station. Step 206 includes step 208, in which the serving base station selects as handoff targets at least said first target base station and a second target base station. Operation proceeds from step 206, via connecting node A 208 to step 210, and from step 206 via connecting node B 211 to 264.

In step 210, the serving base station generates a first handoff message including a first validity time. In some embodiments, the validity time communicated in a handoff message is referred to as a validity timer, e.g., a conditional handover validity timer. In some embodiments, the handoff message identifies the first UE which may be handed off to the first handoff target upon a handoff condition being satisfied, and the first handoff message includes an address corresponding to the first target base station as a destination address. In some embodiments, the first handoff message is a first conditional handoff message, and the first validity time is a first amount of time, e.g., in milliseconds from an admission control operation, triggered by the first handoff message, that the first target base station is to maintain resources allocated to the first UE, e.g. UE content storage for the first UE, without the first UE completing a handoff to the first target base station. In some embodiments, step 210 includes step 212 and step 214. In some embodiments, step 210 includes step 216 and step 224.

In step 212 the serving base station determines a time duration to use as a first validity time based on one or more of: an EARFCN (E-UTAR/LTE Absolute Radio Frequency Control Number) of the first target base station, and ECGI (Evolved Cell Global Identifier) of the first target base station, supported RAT(s) (Radio Access Technologies) in the first target base station, a CSG (Closed Subscriber Group) identify broadcast by the first target cell, e.g., first target base station, an estimated load in the first target cell, e.g., based on information provided by a SON (Self-Organizing Network), rate of change of signal strengths of source cell, e.g., serving base station, reported by the first UE in measurement reports to the source base station, e.g. serving base station, (e.g., calculated from RSRQ (Reference Signal Received Quality), RSRP (Reference Signal Received Power), and SINR (Signal-to-Interference plus Noise Ratio) over multiple time occasions as reported by the first UE in its measurement reports to the source base station), rate of change of signal strengths of the first target cell, e.g., first target base station, as reported by the first UE in its measurement reports to the source base station, e.g., serving base station, (e.g., calculated from RSRQ, RSRP, and SINR over multiple time occasions as reported by the first UE in its measurement reports to the source base station), CQIs (Channel Quality Indicators), e.g., quality of service class identifiers, of ongoing DRBs (Data Radio Bearers) for UEs sessions in which the first UE is involved, and first UE history information. In some embodiments the time duration determination of step 212 is performed using a mathematical function while in other embodiments a lookup table is used to determine the time duration to be used as a first validity time based on one or more of factors which can be used to determine the validity time. Operation proceeds from step 212 to step 214.

In step 214, the serving base station includes said determined time duration as the first validity time in said first handoff message.

In step 216, the serving base station determines a time duration to use as said first validity time based on one or more of: UE loading of said first target base station, a priority level of said first UE or a type of data being communicated to or from said first UE. In some embodiments the time duration determination of step 216 is performed using a mathematical function. In other embodiments step 216 is performed using a lookup table to determine a time duration to be used as a first validity time based on one or more of the factors which can be used to determine the validity time. In some embodiments, step 218 includes one or more or all of steps 218, 220 and 222.

In step 218 the serving base station determines a first time duration when said first target base station is under a first load, e.g., a first traffic load or a first load in terms of the number of UEs being supported, and determines a second time duration when said first target base station is under a second load, e.g., a second traffic load or a second load in terms of the number of UEs being supported, said second load being greater than said first load, said second time duration being shorter than said first time duration. For example, determine to use a shorter timer for a more heavily loaded target base station than for a lightly loaded target base station, so that reserved resources can be freed up more quickly and allocated to another UE at the heavily loaded base station.

In step 220 the serving base station determines a first time duration when said first UE has first priority level, e.g., high priority level, and determines a second time duration when said first UE has a second priority level, e.g., low priority level, said second priority level being a lower priority level than said first priority level, said second time duration being shorter than said first time duration, e.g., use a shorter timer for lower priority UE devices.

In step 222, the serving base station determines a first time duration when said first UE is communicating a first type of data traffic corresponding to a first traffic priority level, e.g., high priority voice traffic for a voice call, and determines a second time duration when said first UE is communicating a second type of data traffic corresponding to a second traffic priority level, e.g., low priority best effort traffic, which is lower than said first traffic priority level, said second time duration being shorter than said first time duration. For example, determine to use a shorter timer for lower data traffic.

Operation proceeds from step 216 to step 224, in which the serving base station includes said determined time duration as the first validity time in said first handoff message. Operation proceeds from step 210, via connecting node C 226, to step 228.

In step 228, the serving base station sends the first handoff message to the first target base station. Operation proceeds from step 228 to step 230.

In step 230 the first target base station receives the first handoff message. Operation proceeds from step 230 to step 232.

In step 232, the first target base station allocates resources at the first target base station to the first UE. Step 232 includes step 234, in which the first target bases station allocates memory for storing context corresponding to the first UE. Operation proceeds from step 232 to step 236.

In step 236 the first target base station stores in memory at the first target bae station context corresponding to the first UE. Operation proceeds from step 236 to step 238.

In step 238 the first target base station starts a first validity timer, e.g., a countdown timer, corresponding to the first UE, said first validity timer having a duration corresponding to the first validity time indicated in the first handoff message. Operation proceeds from step 238, via connecting node D 240, to step 242 and step 244.

In step 242 the first target base station monitors for handoff signals from the first UE. In some embodiments the handoff signal is a PRACH preamble transmission, or MsgA (for 2-step RACH) or Msg3 (for regular CBRA or CFRA) transmission containing the C-RNTI of the UE for which resources have been reserved. Other handoff signals are also possible. Step 242, is performed repetitively. In step 244 the first target base station checks to determine if the first validity timer has expired. Step 244 is performed repetitively.

Step 242 may, and sometimes does, include step 246 in which the first target base station receives a handoff signal from the first UE device. Operation proceeds from step 246 to step 248, in which the first target base station pauses the first validity timer, e.g., halts a countdown of the first validity timer, in response to receiving a handoff from the first UE. Operation proceeds from step 248 to step 250. In step 250 the first target base station determines if handoff of the UE to the first target base station was successful or unsuccessful. Operation proceeds from step 250 to step 252.

In step 252, if the determination is that the handoff of the first UE was successful, then operation proceeds from step 252 to step 254; however, if he determination is that the handoff of the first UE was unsuccessful, then operation proceeds from step 252 to step 256.

In step 254 the first target base station deletes the first validity timer. Operation proceeds from step 254 to step 256, in which the first target base station operates as a point of network attachment for the first UE.

Returning to step 244, in step 244 the first target base station checks to determine if the first validity timer, e.g., a countdown timer, has expired. Step 244 is performed repetitively. Step 244 may, and sometimes does, includes step 260 in which the first target base station determines that the first validity timer has expired. Operation proceeds from step 260 to step 262 in which the first target base station releases resources at the first target base station allocated to first UE in response to determining that the first validity timer has expired. Step 262 includes step 263 in which the first target base station deletes UE context for the first UE if said first validity timer expires.

Returning to step 264, in step 264, the serving base station generates a second handoff message including a second validity time. In some embodiments, the second handoff message identifies the first UE, which may be handed off to the second target upon a handoff condition being satisfied, and the second handoff message includes an address corresponding to the second target base station as a destination address. In some embodiments, the second handoff message is a second conditional handoff message, and the second validity time is a second amount of time, e.g., in milliseconds from an admission control operation triggered by the second handoff message, that the second target base station is to maintain UE context for the first UE device without the first UE device completing a handoff to the second target base station.

In some embodiments, step 264 includes step 266 and step 268. In some embodiments, step 264 includes step 270 and step 278.

In step 266 the serving base station determines a time duration to use as a second validity time based on one or more of: an EARFCN of the second target base station, and ECGI of the second target base station, supported RAT(s) in the second target base station, a CSG identify broadcast by the second target cell, e.g., second target base station, an estimated load in the second target cell, e.g., based on information provided by a SON, rate of change of signal strengths of source cell, e.g., serving base station, reported by the first UE in measurement reports to the source base station, e.g. serving base station, rate of change of signal strengths of the second target cell, e.g., second target base station, as reported by the first UE in its measurement reports to the source base station, e.g., serving base station, CQIs of ongoing DRBs for UEs sessions in which the first UE is involved, and first UE history information. Operation proceeds from step 266 to step 268.

In step 268, the serving base station includes said determined time duration as the second validity time in said second handoff message.

In step 270, the serving base station determines a time duration to use as said second validity time based on one or more of: UE loading of said second target base station, a priority level of said first UE or a type of data being communicated to or from said first UE. In some embodiments, step 270 includes one or more or all of steps 272, 274 and 276.

In step 272 the serving base station determines a first time duration when said second target base station is under a first load and determines a second time duration when said second target base station is under a second load, said second load being greater than said first load, said second time duration being shorter than said first time duration.

In step 274 the serving base station determines a first time duration when said first UE has first priority level and determines a second time duration when said first UE has a second priority level, said second time duration being shorter than said first time duration.

In step 276, the serving base station determines a first time duration when said first UE is communicating a first type of data traffic corresponding to a first traffic priority level and determines a second time duration when said first UE is communicating a second type of data traffic corresponding to a second traffic priority level which is lower than said first traffic priority level, said second time duration being shorter than said first time duration.

Operation proceeds from step 270 to step 278, in which the serving base station includes said determined time duration as the second validity time in said second handoff message.

In some embodiments, the determined time duration, e.g., from step 270, included as the second validity time in said second handoff message indicates a different time duration than the first validity time in the first handoff message.

In some embodiments, the determined time duration, e.g. from step 270, included as the second validity time in the second handoff message is the same as the determined time duration in the first handoff message, when the first and second target base stations are subject to the same loads as indicated by a message communicated to the serving base station by a network management device which monitors base station loading and provides base station load information to base stations.

Operation proceeds from step 264, via connecting node E 280, to step 281.

In step 281, the serving base station sends the second handoff message to the second target base station. Operation proceeds from step 281 to step 282.

In step 282 the second target base station receives the second handoff message. Operation proceeds from step 282 to step 283.

In step 283, the second target base station allocates resources at the second target base station to the first UE. Step 283 includes step 284, in which the second target bases station allocates memory for storing context corresponding to the first UE. Operation proceeds from step 283 to step 285.

In step 285 the second target base station stores in memory at the second target base station context corresponding to the first UE. Operation proceeds from step 285 to step 286.

In step 286 the second target base station starts a second validity timer, e.g., a countdown timer, corresponding to the first UE, said second validity timer having a duration corresponding to the second validity time indicated in the second handoff message. Operation proceeds from step 286, via connecting node F 287, to step 288 and step 289.

In step 288 the second target base station monitors for handoff signals from the first UE. In various embodiments in which step 288 is used the term handoff signals is used to refer to PRACH preamble transmissions with the PRACH mask specified by it, or MsgA (for 2-step RACH) or Msg3 (for regular CBRA or CFRA) transmission containing the C-RNTI of the UE for which resources have been reserved. Thus it should be appreciated that handoff signals include one or more signals which can be used by a UE to access a base station. Thus through the use of such signals and/or additional signals a UE may proceed with switching its point of attachment from one base station to another, e.g., as part of a handoff.

Step 288, is performed repetitively. In step 289 the second target base station checks to determine if the second validity timer has expired. Step 289 is performed repetitively.

Step 288 may, and sometimes does, include step 290 in which the second target base station receives a handoff signal from the first UE device. Operation proceeds from step 290 to step 291, in which the second target base station pauses the second validity timer in response to receiving a handoff from the first UE. Operation proceeds from step 291 to step 292. In step 292 the second target base station determines if handoff of the UE to the second target base station was successful or unsuccessful. Operation proceeds from step 292 to step 293.

In step 293, if the determination is that the handoff of the first UE to the second target base station was successful, then operation proceeds from step 293 to step 294; however, if he determination is that the handoff of the first UE to the second target base station was unsuccessful, then operation proceeds from step 293 to step 295.

In step 294 the second target base station deletes the second validity timer. Operation proceeds from step 294 to step 296, in which the second target base station operates as a point of network attachment for the first UE.

Returning to step 289, in step 289 the second target base station checks to determine if the second validity timer, e.g., a countdown timer, has expired. Step 289 is performed repetitively. Step 289 may, and sometimes does, includes step 297 in which the second target base station determines that the second validity timer has expired. Operation proceeds from step 297 to step 298 in which the second target base station releases resources at the second target base station allocated to first UE in response to determining that the second validity timer has expired. Step 298 includes step 299 in which the second target base station deletes UE context for the first UE if said second validity timer expires.

Figure 3:
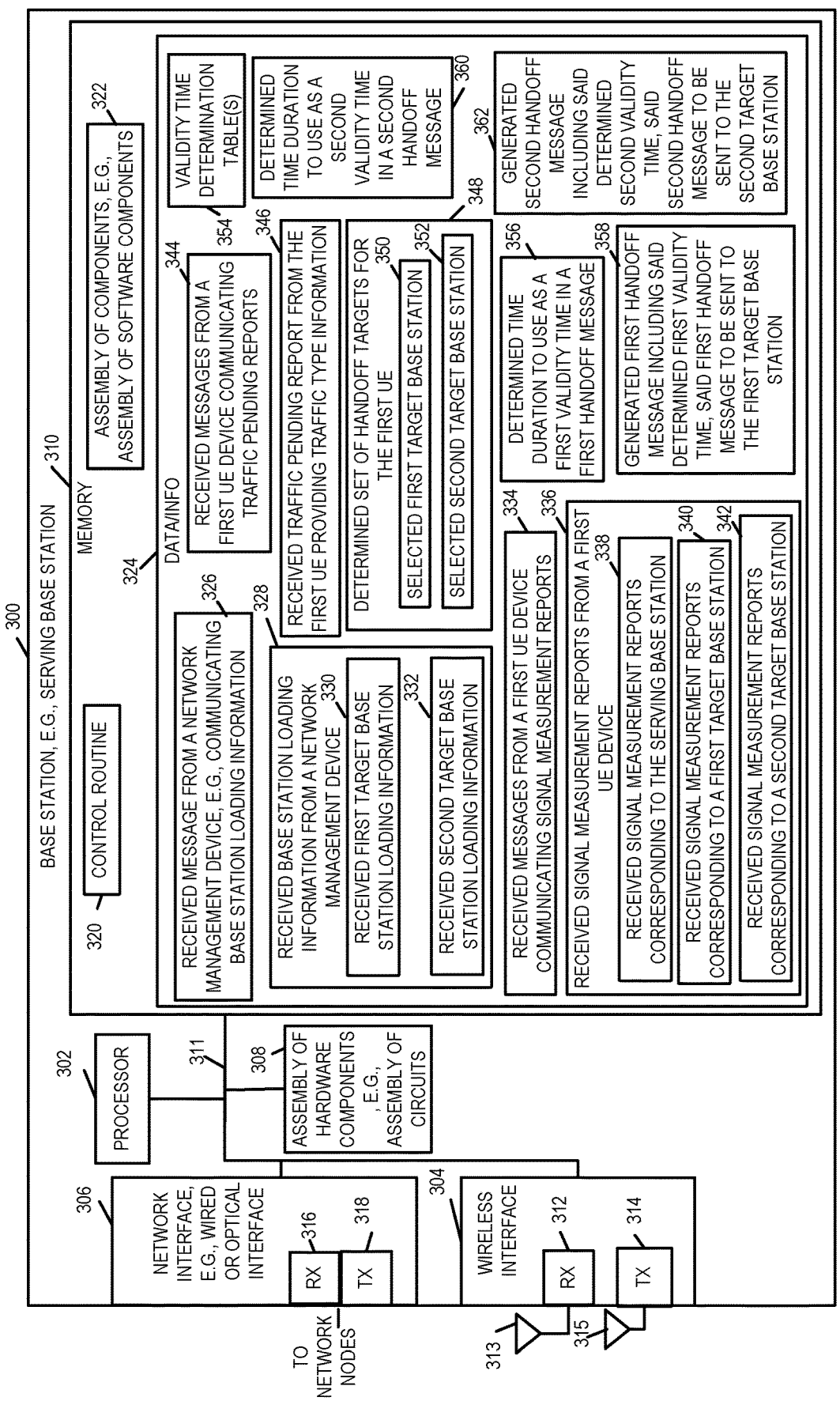
FIG. 3 is a drawing of an exemplary base station, e.g. a serving base station, in accordance with an exemplary embodiment.

FIG. 3 is a drawing of an exemplary base station 300, e.g., a serving base station, in accordance with an exemplary embodiment. In some embodiments, exemplary base station 300 of FIG. 3 implements steps of the exemplary method of flowchart 200 of FIG. 2. Base station 300 is, e.g., any of base stations (base station 1 102, base station 2 106) of FIG. 1.

Base station 300 includes a processor 302, e.g., a CPU, wireless interface 304, a network interface 306, e.g., a wired or optical interface, an assembly of hardware components 308, e.g., an assembly of circuits, and memory 310 coupled together via a bus 311 over which the various elements may interchange data and information.

Network interface 306 includes a receiver 316 and a transmitter 318. Network interface 306 to coupled to network nodes, e.g., via a backhaul network and/or the Internet. Wireless interface 304 includes a wireless receiver 312 and a wireless transmitter 314. The base station 300 receives signals from network devices, e.g., network node 120, and other base stations, e.g., base station 3 106 and base station 4 108, via network receiver 316. An exemplary received message, received via network receiver 313, is a message from a network management device, e.g., a SON device, communicating base station loading information, e.g. first target base station loading information and second target base station loading information. An exemplary signal transmitted via transmitter 318 is a handover message including a validity time, which is sent to a target base station, e.g., a first handover message, which is a first conditional handover message, including a first validity time, said first handover message being sent to the first target base station or a second handover message, which is a second conditional handover message, including a second validity time, said second handover message being sent to the second target base station. Wireless receiver 312 is coupled to a receive antenna 313 via which the base station 300 can receive wireless signals, e.g., wireless signals from UE devices. Wireless transmitter 314 is coupled to a transmit antenna 315 via which the base station 300 can transmit wireless signals to UE devices. Exemplary received wireless signals include reports from a UE device, which is being serviced by base station 300, e.g., received signal measurement reports from a first UE device corresponding to the serving base station, received signal measurement reports from the first UE device corresponding to the first target base station, and received signal measurement reports from the first UE device corresponding to the second target base station. Other exemplary received wireless signals include a traffic pending report from the first UE device.

Memory 310 includes a control routine 320, e.g., for controlling basic functions of the base station, an assembly of components 322, e.g., an assembly of software components, and data/information 324. Data/information 324 includes a received message from a network management device 326, e.g., communicating base station loading information, and received base station loading information from a network management device 328. Received information 328 includes received first target base station loading information 330 and received second target base station loading information 332. Data/information 324 further includes received messages from a first UE device communicating signal measurements reports 335, and received signal measurement reports from a first UE device 336. Received reports 336 includes received signal measurement reports corresponding to the serving base station 338, received signal measurement reports corresponding to a first target base station 340 and received signal measurement reports corresponding to a second target base station 342. Data/information further includes received messages from the first UE device communicating traffic pending reports 344, and received traffic pending report from the first UE device providing traffic type information.

Data/information 324 further includes a determined set of handoff targets for the first UE 348, which includes information identifying a selected first target base station 350 and information identifying a selected second target base station. Data/information 324 further includes validity time determination tables, e.g., one or more or all of table 800 of FIG. 8, table 900 of FIG. 9, table 1000 of FIG. 10, and table 1100 of FIG. 11, which may be, and sometimes are, used by the base station 300 to determine validity times, e.g., a first validity time to be included in the first handoff message and a second validity time to be included in the second handoff message. Data/information 324 further includes determined time duration to use as a first validity time in the first handoff message 356, a generated first handoff message, e.g., a first conditional handoff message, including said determined first validity time, said first handoff message to be sent to the first target base station. Data/information 324 further includes a determined time duration to use as a second validity time in the second handoff message 360, a generated second handoff message, e.g., a second conditional handoff message, including said determined second validity time, said second handoff message to be sent to the second target base station.

Figures 4, 4A:
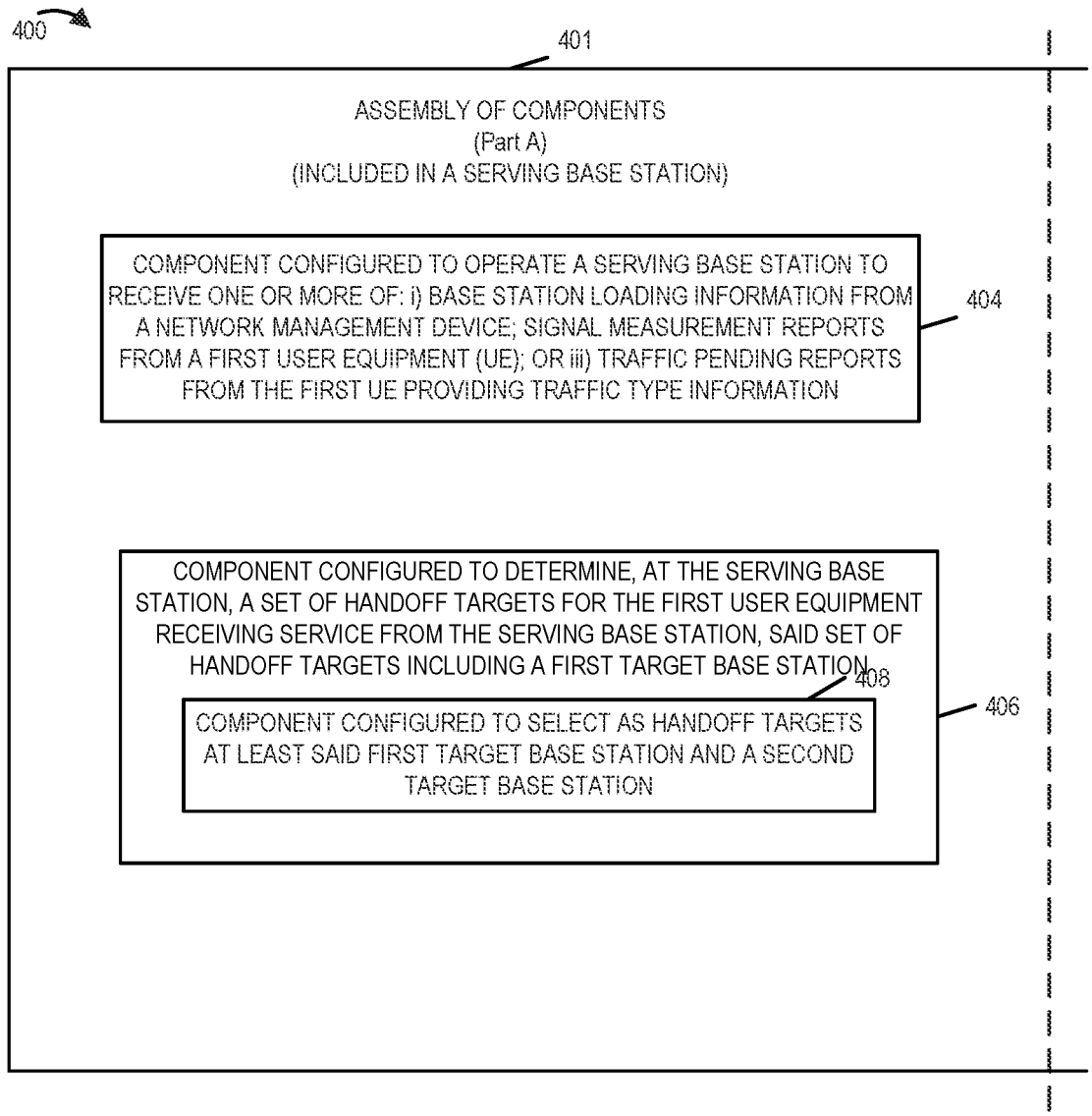
FIG. 4A is a first part of an assembly of components, which may be included in a serving base station, in accordance with an exemplary embodiment.
FIG. 4 comprises the combination of FIG. 4A, FIG. 4B and FIG. 4C.
Figure 4B:
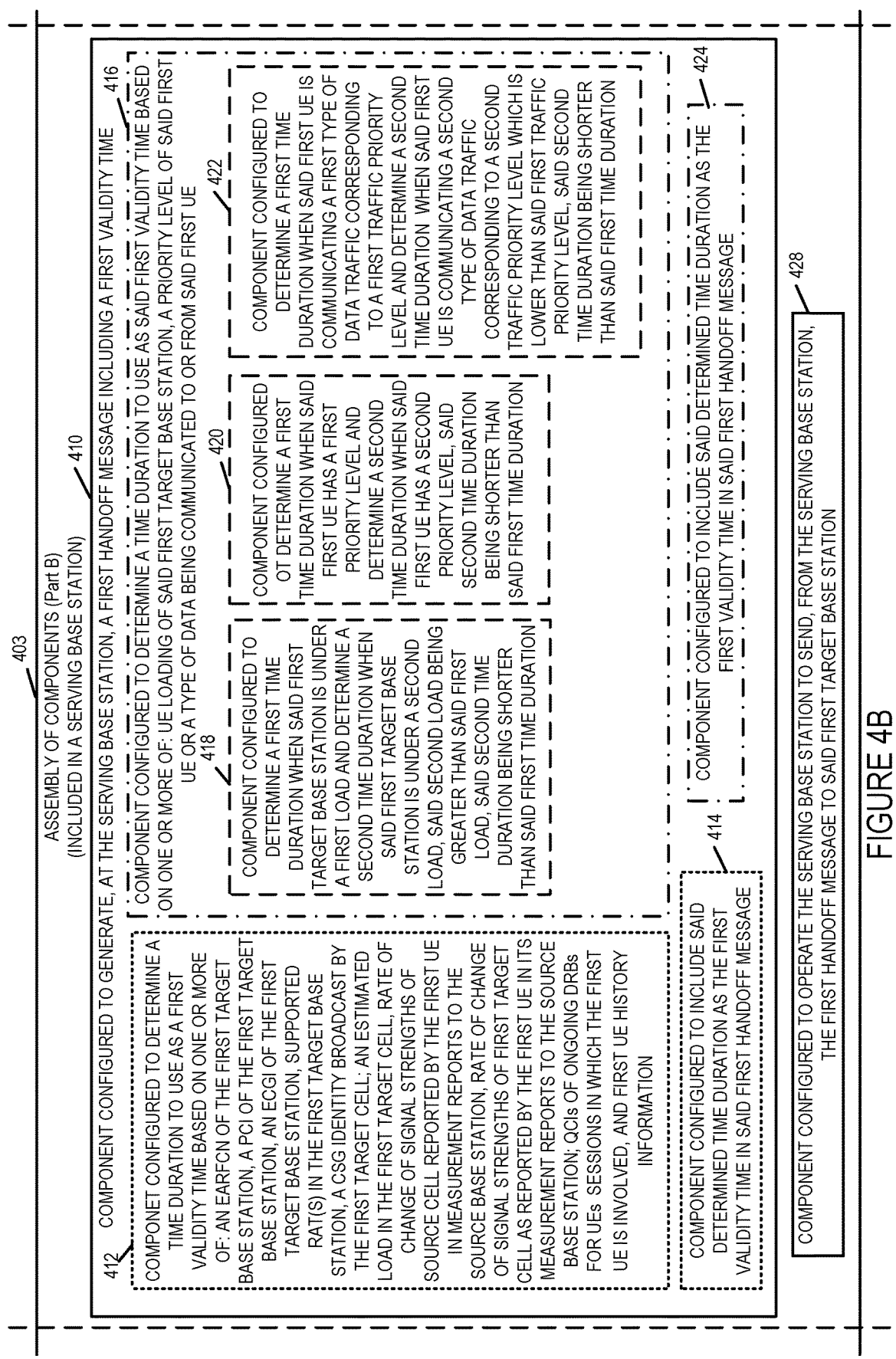
FIG. 4B is a second part of an assembly of components, which may be included in a serving base station, in accordance with an exemplary embodiment.
Figure 4C:
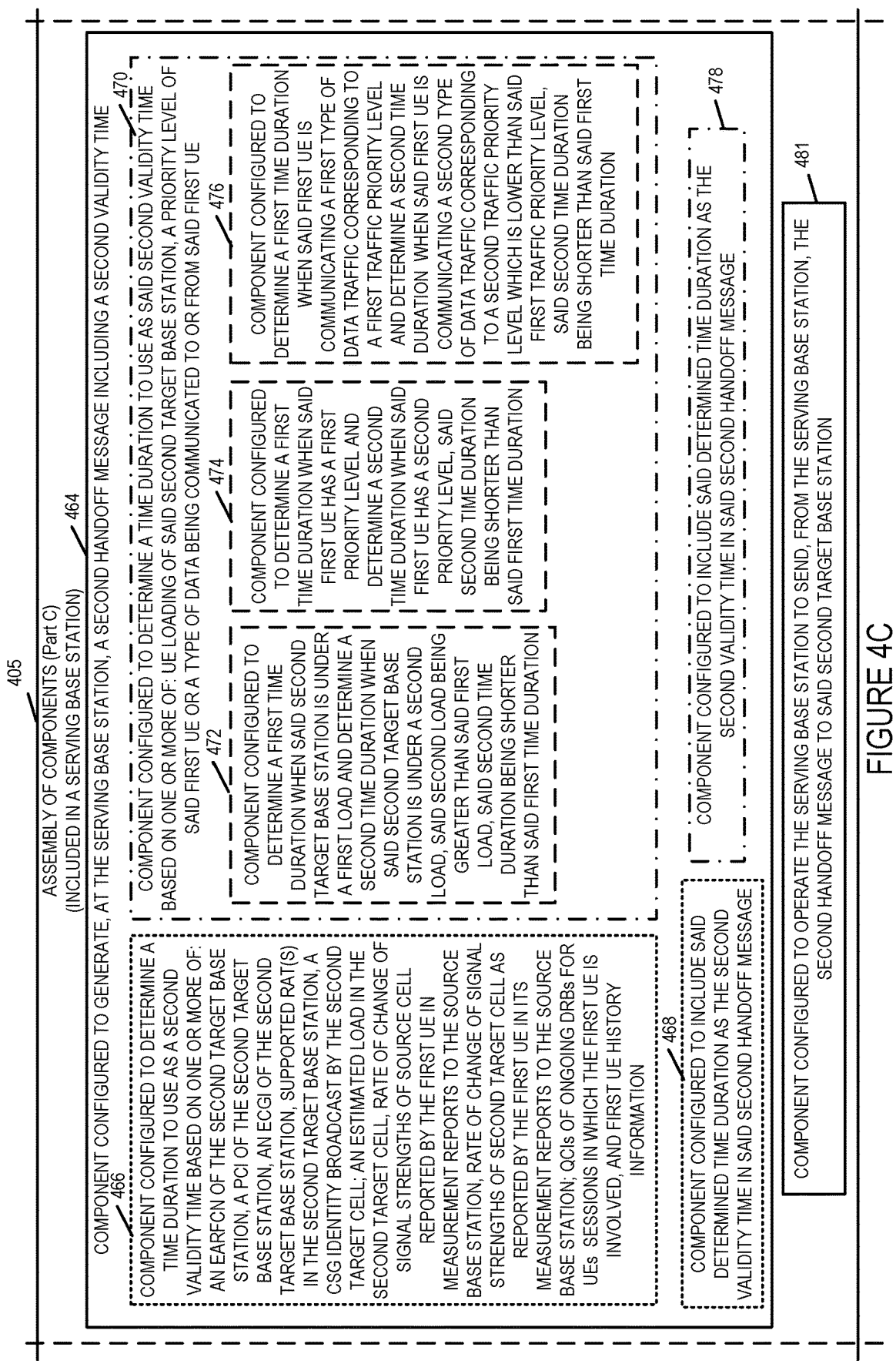
FIG. 4C is a third part of an assembly of components, which may be included in a serving base station, in accordance with an exemplary embodiment.

FIG. 4, comprising the combination of FIG. 4A, FIG. 4B and FIG. 4C, is a drawing of an exemplary assembly of components 400, comprising the combination of Part A 401, Part B 403 and Part C 405, in accordance with an exemplary embodiment. Exemplary assembly of components 400 which may be included in a base station, such as the exemplary base station 300 of FIG. 3, and implement steps of an exemplary method, e.g., steps of the method of the flowchart 200 of FIG. 2.

Assembly of components 400 can be, and in some embodiments is, used in base station 300, e.g., of FIG. 3, base station 1 102 of FIG. 1, or base station 2 104 of FIG. 1. The components in the assembly of components 400 can, and in some embodiments are, implemented fully in hardware within the processor 302, e.g., as individual circuits. The components in the assembly of components 400 can, and in some embodiments are, implemented fully in hardware within the assembly of components 308, e.g., as individual circuits corresponding to the different components. In other embodiments some of the components are implemented, e.g., as circuits, within the processor 302 with other components being implemented, e.g., as circuits within assembly of components 308, external to and coupled to the processor 302. As should be appreciated the level of integration of components on the processor and/or with some components being external to the processor may be one of design choice. Alternatively, rather than being implemented as circuits, all or some of the components may be implemented in software and stored in the memory 310 of the base station 300, with the components controlling operation of the base station to implement the functions corresponding to the components when the components are executed by a processor, e.g., processor 302. In some such embodiments, the assembly of components 400 is included in the memory 310 as assembly of components 322. In still other embodiments, various components in assembly of components 400 are implemented as a combination of hardware and software, e.g., with another circuit external to the processor 302 providing input to the processor 302 which then under software control operates to perform a portion of a component's function. While processor 302 is shown in the FIG. 3 embodiment as a single processor, e.g., computer, it should be appreciated that the processor 302 may be implemented as one or more processors, e.g., computers.

When implemented in software the components include code, which when executed by the processor 302, configure the processor 302 to implement the function corresponding to the component. In embodiments where the assembly of components 400 is stored in the memory 310, the memory 310 is a computer program product comprising a computer readable medium comprising code, e.g., individual code for each component, for causing at least one computer, e.g., processor 302, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 4 control and/or configure the base station 300, or elements therein such as the processor 302, to perform the functions of corresponding steps illustrated and/or described in the method of one or more of the flowcharts, signaling diagrams and/or described with respect to any of the Figures. Thus the assembly of components 400 includes various components that perform functions of corresponding one or more described and/or illustrated steps of an exemplary method, e.g., steps of the method of flowchart 200 of FIG. 2 and/or described or shown with respect to any of the other figures.

Assembly of components 400 includes a component 404 configured to operate a serving base station to receive one or more of: i) base station loading information from a network management device; signal measurement reports from a first UE device; or iii) traffic pending reports from the first UE providing traffic type information, and a component 406 configured to determine, at the serving base station, a set of handoff targets for the first UE receiving service from the serving base station, said set of handoff targets including a first target base station. Component 406 includes a component 408 configured to select as handoff targets at least said first target base station and a second target base station.

Assembly of components 400 further includes a component 410 configured to generate, at the serving base station, a first handoff message including a first validity time. Component 410 includes a component 412 configured to determine a time duration to use as the first validity time based on one or more of: an EARFCN of the first target base station, a PCI of the first target base station, an ECGI of the first target base station, supported RAT(s) in the first target base station, a CSG identity broadcast by the first target cell, an estimated load in the first target cell, rate of change of signal strengths of source cell reported by the first UE in measurement reports to the source (serving) base station, rate of change of signal strengths of first target cell (first target base station) as reported by the first UE in measurement reports to the source base station, QCIs of ongoing DRBs for UEs sessions in which the first UE is involved, and first UE history information, a component 414 configured to include said determined time duration, e.g., from component 412, as the first validity time in said first handoff message. Component 410 further includes a component 416 configured to determine a time duration to use as the first validity time based on one or more of: UE loading of the first target base station, a priority level of the first UE or a type of data being communicated to or from the first UE. Component 416 includes a component 418 configured to determine a first time duration when said first target base station I under a first load and determine a second time duration when said first target base station is under a second load, said second load being greater than said first load, said second time duration being shorter than said first time duration, a component 420 configured to determine a first time duration when said first UE has a first priority level and determine a second time duration when said first UE has a second priority level, said second time duration being shorter than said first time duration, and a component 422 configured to determine a first time duration when said first UE is communicating a first type of data traffic corresponding to a first traffic priority level and determine a second time duration when said first UE is communicating a second type of data traffic corresponding to a second traffic priority level, which is lower than said first traffic priority level, said second time duration being shorter than said first time duration. Component 410 further includes a component 424 configured to include said determined time duration, e.g., from component 416, as the first validity time in said first handoff message. Assembly of components 400 further includes a component 428 configured to operate the serving base station to send, from the serving base station, the first handoff message to said first target base station.

Assembly of components 400 further includes a component 464 configured to generate, at the serving base station, a second handoff message including a second validity time. Component 464 includes a component 466 configured to determine a time duration to use as the second validity time based on one or more of: an EARFCN of the second target base station, a PCI of the second target base station, an ECGI of the second target base station, supported RAT(s) in the second target base station, a CSG identity broadcast by the second target cell (second target base station), an estimated load in the second target cell (second target base station), rate of change of signal strengths of source cell reported by the first UE in measurement reports to the source base station, rate of change of signal strengths of second target cell as reported by the first UE in measurement reports to the source base station, QCIs of ongoing DRBs for UEs sessions in which the first UE is involved, and first UE history information, a component 468 configured to include said determined time duration, e.g., from component 466, as the second validity time in said second handoff message. Component 464 further includes a component 470 configured to determine a time duration to use as the second validity time based on one or more of: UE loading of the second target base station, a priority level of the first UE or a type of data being communicated to or from the first UE. Component 470 includes a component 472 configured to determine a first time duration when said second target base station is under a first load and determine a second time duration when said second target base station is under a second load, said second load being greater than said first load, said second time duration being shorter than said first time duration, a component 474 configured to determine a first time duration when said first UE has a first priority level and determine a second time duration when said first UE has a second priority level, said second time duration being shorter than said first time duration, and a component 476 configured to determine a first time duration when said first UE is communicating a first type of data traffic corresponding to a first traffic priority level and determine a second time duration when said first UE is communicating a second type of data traffic corresponding to a second traffic priority level, which is lower than said first traffic priority level, said second time duration being shorter than said first time duration. Component 464 further includes a component 478 configured to include said determined time duration, e.g., from component 470, as the second validity time in said second handoff message. Assembly of components 400 further includes a component 481 configured to operate the serving base station to send, from the serving base station, the second handoff message to said second target base station.

Figure 5:
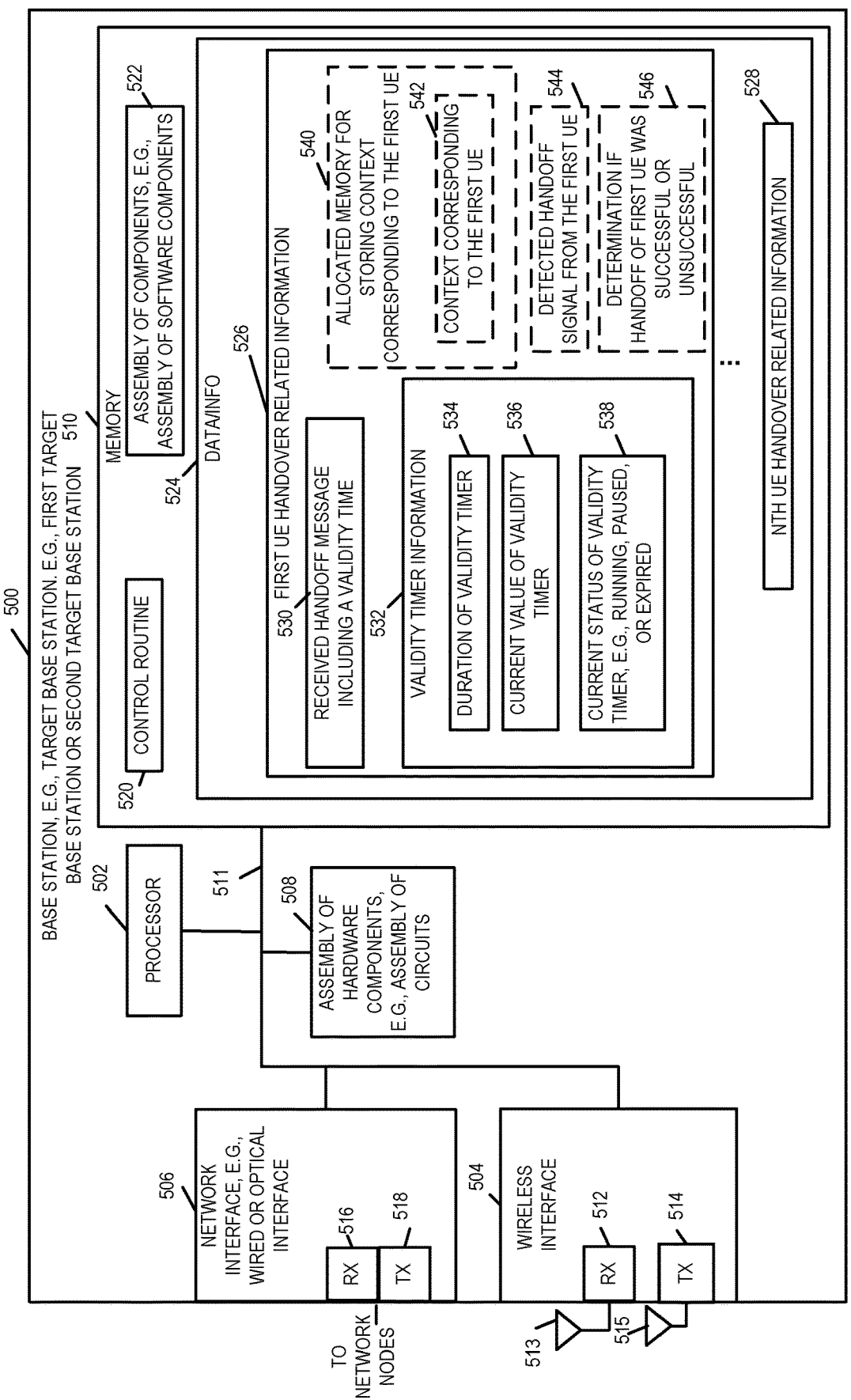
FIG. 5 is a drawing of an exemplary base station, e.g. a target base station, in accordance with an exemplary embodiment.

FIG. 5 is a drawing of an exemplary base station 500, e.g., a target base station, e.g., first target base station or a second target base station, in accordance with an exemplary embodiment. In some embodiments, exemplary base station 500 of FIG. 5 implements steps of the exemplary method of flowchart 200 of FIG. 2. Base station 500 is, e.g., any of base stations (base station 3 106, base station 4 108, base station 5 110, base station 6 112, base station 7 114, base station 8 116, . . . , base station N 118) of FIG. 1.

Base station 500 includes a processor 502, e.g., a CPU, wireless interface 504, a network interface 506, e.g., a wired or optical interface, an assembly of hardware components 508, e.g., an assembly of circuits, and memory 510 coupled together via a bus 511 over which the various elements may interchange data and information.

Network interface 506 includes a receiver 516 and a transmitter 518. Network interface 506 to coupled to network nodes, e.g., via a backhaul network and/or the Internet. Wireless interface 504 includes a wireless receiver 512 and a wireless transmitter 514. The base station 500 receives signals from network devices, e.g., network node 120, and other base station, e.g., base station 1 102, via network receiver 516. An exemplary received signal, which is received via receiver 516, is a handover message including a validity time, which was sent from a serving base station, e.g., base station 1 102. Wireless receiver 512 is coupled to a receive antenna 513 via which the base station 500 can receive wireless signals, e.g., wireless signals from UE devices. Wireless transmitter 514 is coupled to a transmit antenna 515 via which the base station 500 can transmit wireless signals to UE devices. An exemplary wireless signal received via wireless receiver 512 is a detected handoff signal from the first UE.

Memory 510 includes a control routine 520, e.g., for controlling basic functions of the base station, an assembly of components 522, e.g., an assembly of software components, and data/information 524. Data/information 524 includes handover information, e.g. conditional handover information, corresponding to a plurality of UEs, including first UE handover related information 526 and Nth UE handover related information. First UE handover related information 526 includes a received handover message including a validity timer, e.g., a first handover message including a first validity time or a second handover message including a second validity time. First UE handover related information 526 further includes validity timer information, e.g., first validity timer information or second validity timer information. Validity timer information 532 includes duration of the validity timer 534, current value of the validity timer 536, and current status of the validity timer, e.g., running, paused, or expired.

First UE handover related information 526 may, and sometimes does, include allocated memory for storing context corresponding to the first UE, a detected handoff signal from the first UE 544, and a determination if handoff of the first UE was successful or unsuccessful. Allocated memory for storing context corresponding to the first UE 540 may, and sometimes does, include context corresponding to the first UE.

Figure 6:
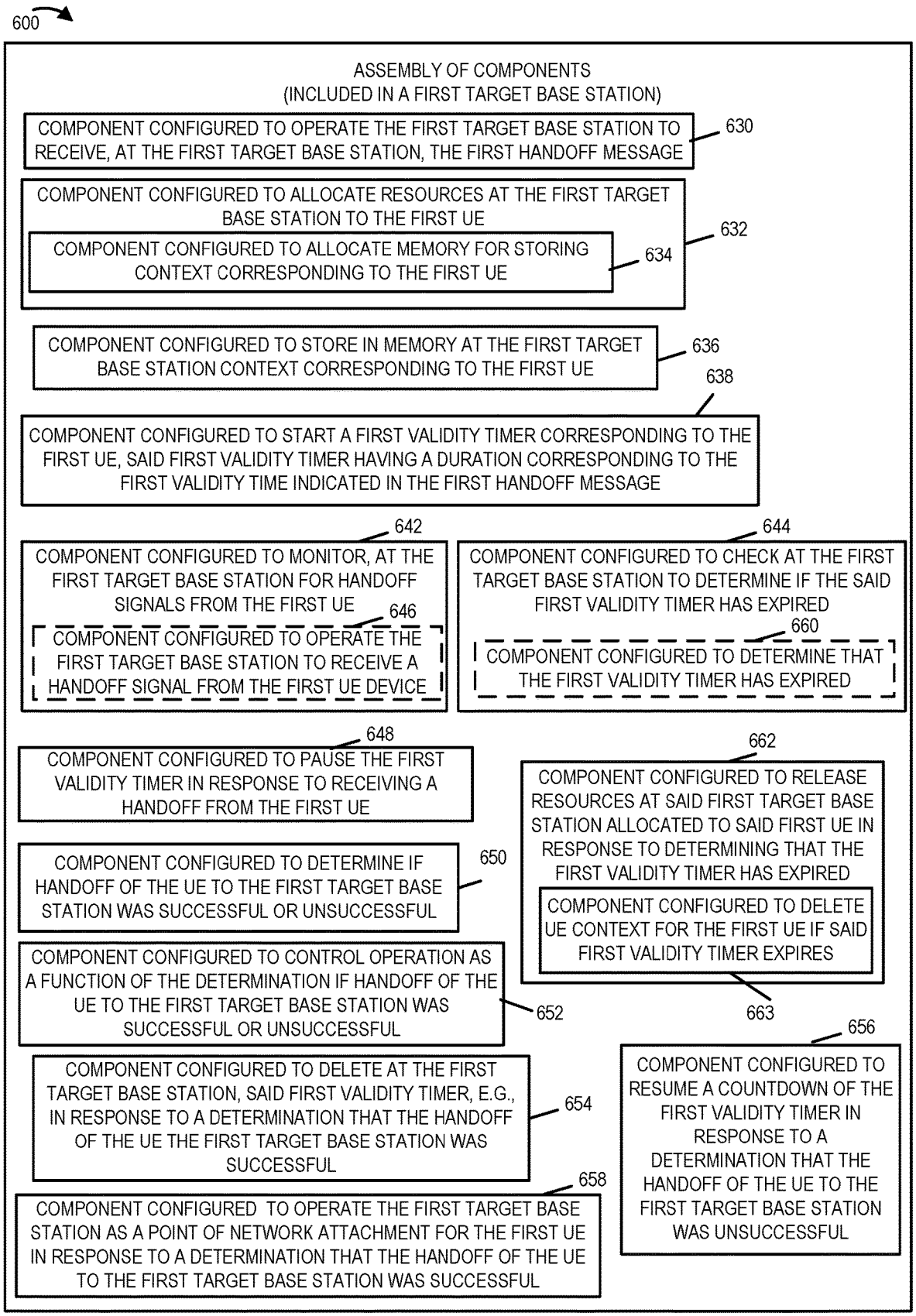
FIG. 6 is a drawing of an exemplary assembly of components, which may be included in a first target base station, in accordance with an exemplary embodiment.

FIG. 6 is a drawing of an exemplary assembly of components 600 in accordance with an exemplary embodiment. Exemplary assembly of components 600 may be included in a first target base station, such as the exemplary base station 500 of FIG. 5, and implement steps of an exemplary method, e.g., steps of the method of the flowchart 200 of FIG. 2 which are performed by the first target base station.

Assembly of components 600 can be, and in some embodiments is, used in base station 500, e.g., of FIG. 5, base station 3 106, base station 4 108, base station 5 110, base station 6 112, base station 7 114, base station 8 116, or base station N 118 of FIG. 1. The components in the assembly of components 600 can, and in some embodiments are, implemented fully in hardware within the processor 502, e.g., as individual circuits. The components in the assembly of components 600 can, and in some embodiments are, implemented fully in hardware within the assembly of components 508, e.g., as individual circuits corresponding to the different components. In other embodiments some of the components are implemented, e.g., as circuits, within the processor 502 with other components being implemented, e.g., as circuits within assembly of components 508, external to and coupled to the processor 502. As should be appreciated the level of integration of components on the processor and/or with some components being external to the processor may be one of design choice. Alternatively, rather than being implemented as circuits, all or some of the components may be implemented in software and stored in the memory 510 of the base station 500, with the components controlling operation of the base station to implement the functions corresponding to the components when the components are executed by a processor, e.g., processor 502. In some such embodiments, the assembly of components 600 is included in the memory 510 as assembly of components 522. In still other embodiments, various components in assembly of components 600 are implemented as a combination of hardware and software, e.g., with another circuit external to the processor 502 providing input to the processor 502 which then under software control operates to perform a portion of a component's function. While processor 502 is shown in the FIG. 5 embodiment as a single processor, e.g., computer, it should be appreciated that the processor 502 may be implemented as one or more processors, e.g., computers.

When implemented in software the components include code, which when executed by the processor 502, configure the processor 502 to implement the function corresponding to the component. In embodiments where the assembly of components 600 is stored in the memory 510, the memory 510 is a computer program product comprising a computer readable medium comprising code, e.g., individual code for each component, for causing at least one computer, e.g., processor 502, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 6 control and/or configure the base station 500, or elements therein such as the processor 502, to perform the functions of corresponding steps illustrated and/or described in the method of one or more of the flowcharts, signaling diagrams and/or described with respect to any of the Figures. Thus the assembly of components 600 includes various components that perform functions of corresponding one or more described and/or illustrated steps of an exemplary method, e.g., steps of the method of flowchart 200 of FIG. 2, which are performed by the first target base station, and/or described or shown with respect to any of the other figures.

Assembly of components 600 includes a component 603 configured to operate the first target base station to receive, at the first target base station, the first handoff message, and a component 632 configured to allocate resources at the first target base station to the first UE. Component 632 includes a component 634 configured to allocate memory for storing context corresponding to the first UE.

Assembly of components 600 further includes a component 636 configured to store in memory at the first target base station context corresponding to the first UE, and a component 638 configured to start a first validity timer corresponding to the first UE, said first validity timer having a duration corresponding to the first validity time indicated in the first handoff message.

Assembly of components 600 further includes a component 642 configured to monitor, at the first target base station, for handoff signals from the first UE, and a component 644 configured to check at the first target base station to determine if said first validity timer has expired. Component 642 includes a component 646 configured to operate the first target base station to receive a handoff signal for the first UE device. Component 644 includes a component 660 configured to determine that the first validity timer has expired. Assembly of components 600 further includes a component 662 configured to release resources at said first target base station allocated to said first UE in response to determining that the first validity timer has expired. Component 662 includes a component 663 configured to delete the UE context for the first UE if the first validity timer has expired.

Assembly of components 600 further includes a component 648 configured to pause the first validity timer in response to receiving a handoff from the first UE, a component 650 configured to determine if the handoff of the first UE to the first target base station was successful or unsuccessful, a component 652 configured to control operation as a function of the determination if handoff of the first UE to the first target base station was successful, a component 654 configured to delete at the first target base station said first validity timer, e.g., in response to a determination that the handoff of the first UE to the first target base station was successful, a component 656 configured to operate the first target base station as a point of network attachment for the first UE in response to a determination that the handoff of the first UE to the first target base station was successful, and a component 656 configured to resume a countdown of the first validity timer in response to a determination that the handoff of the first UE to the first target base station was unsuccessful.

Figure 7:
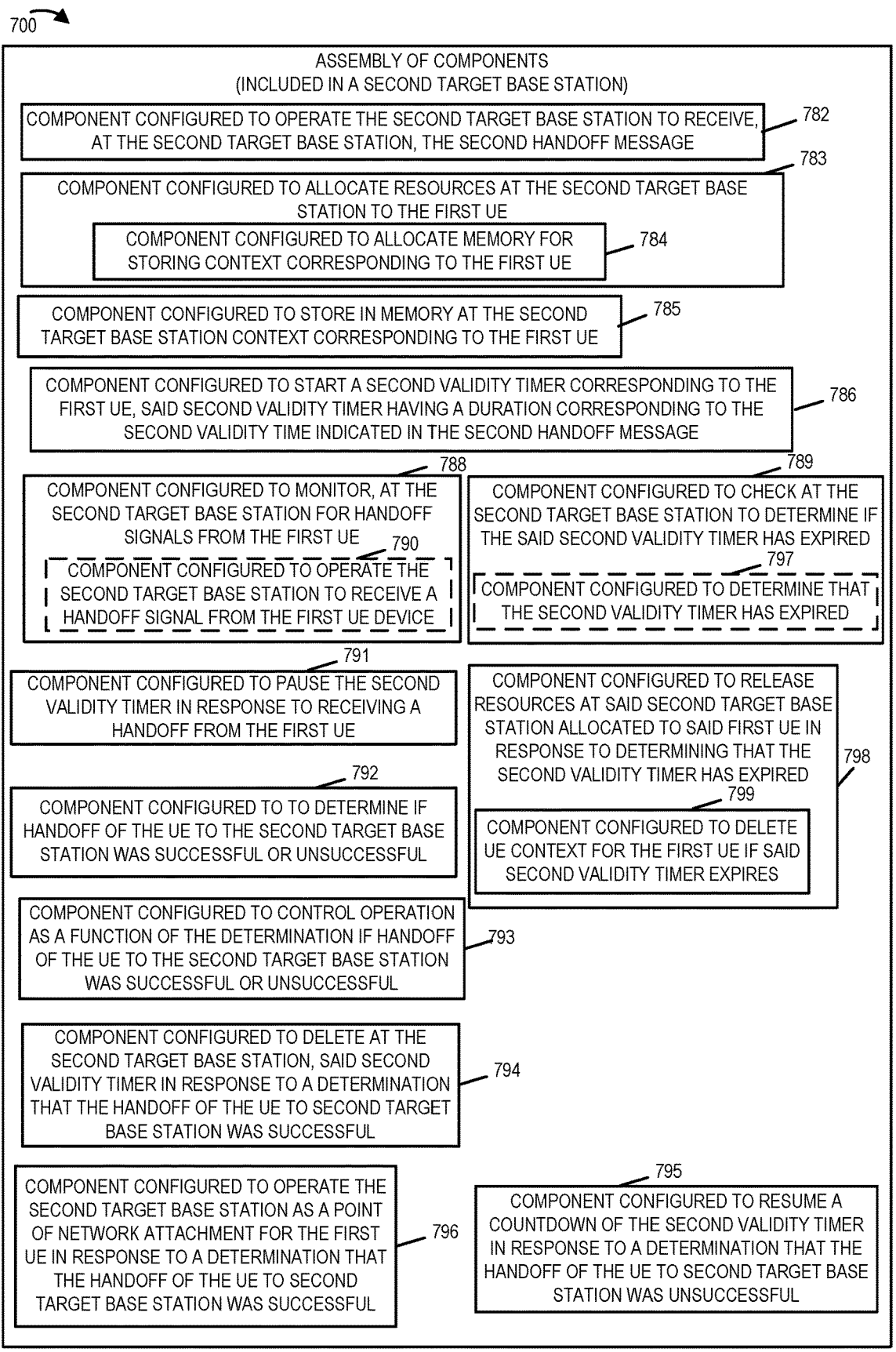
FIG. 7 is a drawing of an exemplary assembly of components, which may be included in a second target base station, in accordance with an exemplary embodiment.

FIG. 7 is a drawing of an exemplary assembly of components 700 in accordance with an exemplary embodiment. Exemplary assembly of components 700 may be included in a second target base station, such as the exemplary base station 500 of FIG. 5, and implement steps of an exemplary method, e.g., steps of the method of the flowchart 200 of FIG. 2 which are performed by the second target base station.

Assembly of components 700 can be, and in some embodiments is, used in base station 500, e.g., of FIG. 5, base station 3 106, base station 4 108, base station 5 110, base station 6 112, base station 7 114, base station 8 116, or base station N 118 of FIG. 1. The components in the assembly of components 700 can, and in some embodiments are, implemented fully in hardware within the processor 502, e.g., as individual circuits. The components in the assembly of components 700 can, and in some embodiments are, implemented fully in hardware within the assembly of components 508, e.g., as individual circuits corresponding to the different components. In other embodiments some of the components are implemented, e.g., as circuits, within the processor 502 with other components being implemented, e.g., as circuits within assembly of components 508, external to and coupled to the processor 502. As should be appreciated the level of integration of components on the processor and/or with some components being external to the processor may be one of design choice. Alternatively, rather than being implemented as circuits, all or some of the components may be implemented in software and stored in the memory 510 of the base station 500, with the components controlling operation of the base station to implement the functions corresponding to the components when the components are executed by a processor, e.g., processor 502. In some such embodiments, the assembly of components 700 is included in the memory 510 as assembly of components 522. In still other embodiments, various components in assembly of components 700 are implemented as a combination of hardware and software, e.g., with another circuit external to the processor 502 providing input to the processor 502 which then under software control operates to perform a portion of a component's function. While processor 502 is shown in the FIG. 5 embodiment as a single processor, e.g., computer, it should be appreciated that the processor 502 may be implemented as one or more processors, e.g., computers.

When implemented in software the components include code, which when executed by the processor 502, configure the processor 502 to implement the function corresponding to the component. In embodiments where the assembly of components 700 is stored in the memory 510, the memory 510 is a computer program product comprising a computer readable medium comprising code, e.g., individual code for each component, for causing at least one computer, e.g., processor 502, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the base station 500, or elements therein such as the processor 502, to perform the functions of corresponding steps illustrated and/or described in the method of one or more of the flowcharts, signaling diagrams and/or described with respect to any of the Figures. Thus the assembly of components 700 includes various components that perform functions of corresponding one or more described and/or illustrated steps of an exemplary method, e.g., steps of the method of flowchart 200 of FIG. 2, which are performed by the second target base station, and/or described or shown with respect to any of the other figures.

Assembly of components 700 includes a component 782 configured to operate the second target base station to receive, at the second target base station, the second handoff message, and a component 783 configured to allocate resources at the second target base station to the first UE. Component 783 includes a component 784 configured to allocate memory for storing context corresponding to the first UE.

Assembly of components 700 further includes a component 785 configured to store in memory at the second target base station context corresponding to the first UE, and a component 786 configured to start a second validity timer corresponding to the first UE, said second validity timer having a duration corresponding to the second validity time indicated in the second handoff message.

Assembly of components 700 further includes a component 788 configured to monitor, at the second target base station, for handoff signals from the first UE, and a component 789 configured to check at the second target base station to determine if said second validity timer has expired. Component 788 includes a component 790 configured to operate the second target base station to receive a handoff signal for the first UE device. Component 789 includes a component 797 configured to determine that the second validity timer has expired. Assembly of components 700 further includes a component 798 configured to release resources at said second target base station allocated to said first UE in response to determining that the second validity timer has expired. Component 798 includes a component 799 configured to delete the UE context for the first UE if the second validity timer has expired.

Assembly of components 700 further includes a component 791 configured to pause the second validity timer in response to receiving a handoff from the first UE, a component 792 configured to determine if the handoff of the first UE to the second target base station was successful or unsuccessful, a component 793 configured to control operation as a function of the determination if handoff of the first UE to the second target base station was successful, a component 794 configured to delete at the second target base station said second validity timer, e.g., in response to a determination that the handoff of the first UE to the second target base station was successful, a component 796 configured to operate the second target base station as a point of network attachment for the first UE in response to a determination that the handoff of the first UE to the second target base station was successful, and a component 795 configured to resume a countdown of the second validity timer in response to a determination that the handoff of the first UE to the second target base station was unsuccessful.

Figure 8:
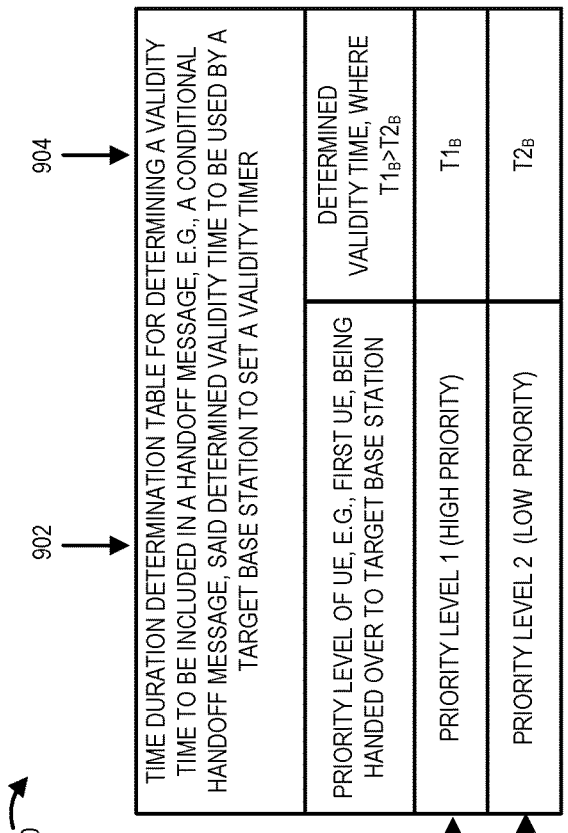
FIG. 8 is a drawing of an exemplary time duration determination table, used by a serving base station to determine a validity time, to be communicated to a target base station in a handoff message, e.g. a conditional handoff message, said validity time to be used to set a validity timer in the target base station, said time duration being determined based on the UE loading level at the target base station, in accordance with an exemplary embodiment.

FIG. 8 is a drawing of an exemplary time duration determination table 800, used by a serving base station to determine a validity time, to be communicated to a target base station in a handoff message, e.g. a conditional handoff message, said validity time to be used to set a validity timer in the target base station, said time duration being determined based on the UE loading level at the target base station, in accordance with an exemplary embodiment. First column 802 represents UE loading level at the target base station, e.g., number of UEs currently being served by the target base station. Second column 804 represents the determined validity time, where T1A>T2A. Row 806 indicates that for load level 1, e.g., the number of UEs being served by the target base station is greater than or equal to zero and less than or equal to 5, the validity time is determined to be T1A. Row 808 indicates that for load level 2, e.g., the number of UEs being served by the target base station is greater than 5, the validity time is determined to be T1B.

Figure 9:
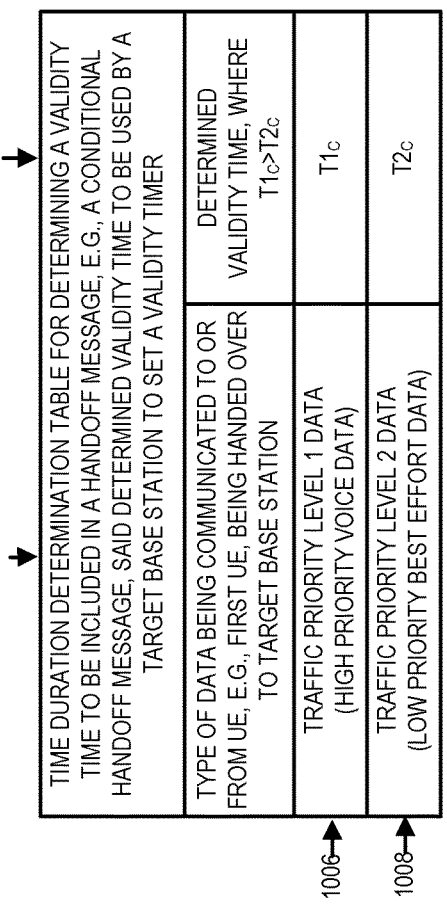
FIG. 9 is a drawing of another exemplary time duration determination table, used by a serving base station to determine a validity time, to be communicated to a target base station in a handoff message, e.g. a conditional handoff message, said validity time to be used to set a validity timer in the target base station, said time duration being determined based on the priority level of the UE device being handed over, in accordance with an exemplary embodiment.

FIG. 9 is a drawing of another exemplary time duration determination table 900, used by a serving base station to determine a validity time, to be communicated to a target base station in a handoff message, e.g. a conditional handoff message, said validity time to be used to set a validity timer in the target base station, said time duration being determined based on the priority level of the UE device being handed over, in accordance with an exemplary embodiment. First column 902 represents the priority level of UE, e.g., the first UE, which may be handed over from the serving base station to the target base station. Second column 904 represents the determined validity time, where T1B>T2B. Row 906 indicates that for a priority level 1 (high priority) UE, the validity time is determined to be T1A. Row 908 indicates that for a priority level 2 (low priority) UE, the validity time is determined to be T1B.

Figure 10:
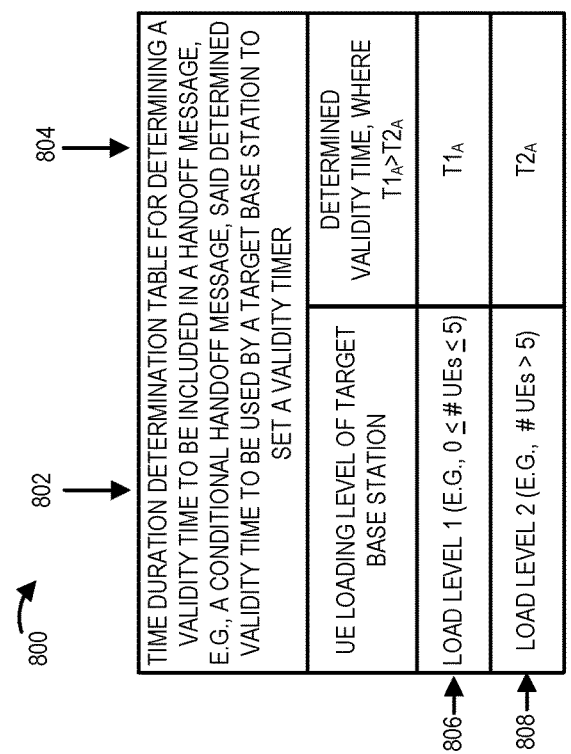
FIG. 10 is a drawing of still another exemplary time duration determination table, used by a serving base station to determine a validity time, to be communicated to a target base station in a handoff message, e.g. a conditional handoff message, said validity time to be used to set a validity timer in the target base station, said time duration being determined based on the type of traffic data being communicated to or from UE device being handed over, in accordance with an exemplary embodiment.

FIG. 10 is a drawing of still another exemplary time duration determination table 1000, used by a serving base station to determine a validity time, to be communicated to a target base station in a handoff message, e.g. a conditional handoff message, said validity time to be used to set a validity timer in the target base station, said time duration being determined based on the type of traffic data being communicated to or from UE device being handed over, in accordance with an exemplary embodiment. First column 1002 represents the tyeo of data traffic being communicated to or from UE, e.g. first UE, being handed over to a target base station. Second column 1004 represents the determined validity time, where T1C>T2C. Row 1006 indicates that for traffic priority level 1 data, e.g., high priority voice data, the validity time is determined to be T1C. Row 1008 indicates that for traffic priority level 2 data, e.g., low priority best effort data, the validity time is determined to be T2C.

FIG. 11 is a drawing of yet another exemplary time duration determination table 1100, used by a serving base station to determine a validity time, to be communicated to a target base station in a handoff message, e.g. a conditional handoff message, said validity time to be used to set a validity timer in the target base station, said time duration being determined based on: i) the UE loading level at the target base station, ii) the priority level of the UE device being handed over and iii) the type of traffic data being communicated to or from UE device being handed over, in accordance with an exemplary embodiment. First column 1102 represents UE loading level at the target base station, e.g., the number of UEs currently being served by the target base station. Second column 1104 represents the priority level of UE, e.g., the first UE, which may be handed over from the serving base station to the target base station. Third column 1006 represents the type of data traffic being communicated to or from UE, e.g. first UE, being handed over to a target base station. Second column 1004 represents the determined validity time, where T1C>T2C. Fourth column 1108 represents the determined validity time, where T1>T2>T3>T4.

Row 1110 indicates that for: i) load level 1, e.g., the number of UEs being served by the target base station is greater than or equal to zero and less than or equal to 5, ii) UE priority level 1 (high priority) and iii) traffic priority level 1 data, e.g., high priority voice data, the validity time is determined to be T1. Row 1112 indicates that for: i) load level 1, e.g., the number of UEs being served by the target base station is greater than or equal to zero and less than or equal to 5, ii) UE priority level 1 (high priority) and iii) traffic priority level 2 data, e.g., low priority best effort data, the validity time is determined to be T2. Row 1114 indicates that for: i) load level 1, e.g., the number of UEs being served by the target base station is greater than or equal to zero and less than or equal to 5, ii) UE priority level 2 (low priority) and iii) traffic priority level 1 data, e.g., high priority vocei data, the validity time is determined to be T2. Row 1116 indicates that for: i) load level 1, e.g., the number of UEs being served by the target base station is greater than or equal to zero and less than or equal to 5, ii) UE priority level 2 (low priority) and iii) traffic priority level 2 data, e.g., low priority best effort data, the validity time is determined to be T3.

Row 1118 indicates that for: i) load level 2, e.g., the number of UEs being served by the target base station is greater than 5, ii) UE priority level 1 (high priority) and iii) traffic priority level 1 data, e.g., high priority voice data, the validity time is determined to be T2. Row 1120 indicates that for: i) load level 2, e.g., the number of UEs being served by the target base station is greater than 5, ii) UE priority level 1 (high priority) and iii) traffic priority level 2 data, e.g., low priority best effort data, the validity time is determined to be T3. Row 1122 indicates that for: i) load level 2, e.g., the number of UEs being served by the target base station is greater than 5, ii) UE priority level 2 (low priority) and iii) traffic priority level 1 data, e.g., high priority voice data, the validity time is determined to be T3. Row 1124 indicates that for: i) load level 2, e.g., the number of UEs being served by the target base station is greater than 5, ii) UE priority level 2 (low priority) and iii) traffic priority level 2 data, e.g., low priority best effort data, the validity time is determined to be T4.

Figure 12A:
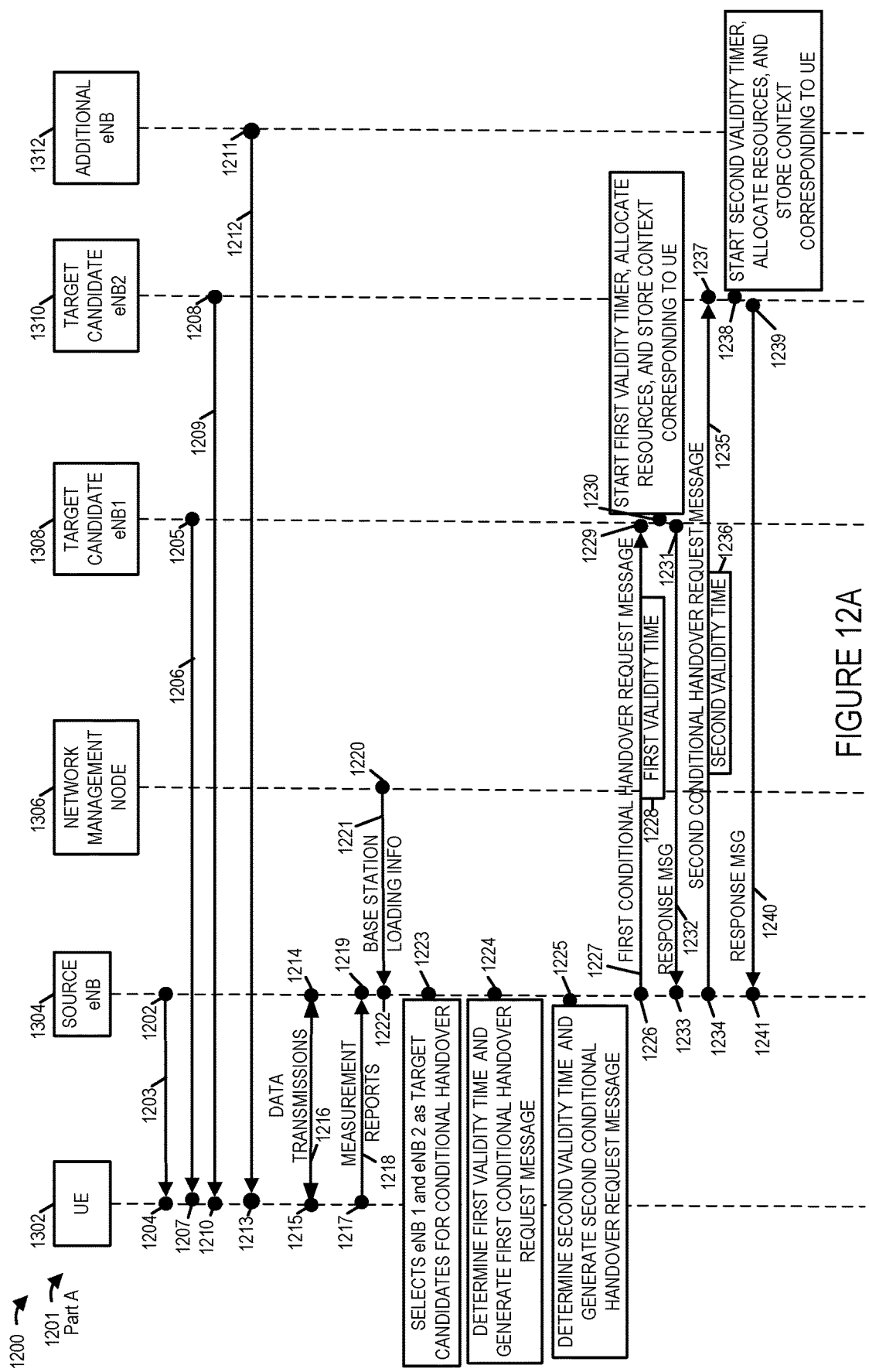
FIG. 12A is a first part of a signaling diagram illustrating exemplary conditional handover including the use of conditional handover timers in accordance with an exemplary embodiment.

FIG. 12, comprising the combination of FIG. 12A and FIG. 12B, is a drawing 1200, comprising the combination of Part A 1201 and Part B, illustrating exemplary devices in an exemplary communications system, and exemplary signaling and operations in accordance with an exemplary embodiment. The exemplary system shown in FIG. 12 includes UE 1302, source eNB 1304, a network management node 1306, target candidate eNB 1 1308, target candidate eNB2 1310 and an additional eNB 1312. In one exemplary embodiment, the communications system is system 100 of FIG. 1, UE 1301 of FIG. 12 is UE 1 124 if FIG. 1, source eNB 1304 of FIG. 12 is base station 1 102 of FIG. 1, network management node 1306 of FIG. 12 is SON node 122 of FIG. 1, target candidate eNB1 1308 of FIG. 12 is base station 2 107 of FIG. 1, target candidate eNB 2 1310 of FIG. 12 is base station 4 108 of FIG. 1, and additional eNB 1312 of FIG. 12 is base station 5 110 of FIG. 1. In some embodiments, source eNB 1304 implements steps performed in flowchart 200 of FIG. 2, which are performed by the serving base station, target candidate eNB1 1308 implements steps in flowchart 200 of FIG. 2 which are performed by the first target base station, and target candidate eNB2 1310 implements steps in flowchart 200 of FIG. 2 which are performed by the second target base station.

Consider that UE 1302 is connected to source eNB 1304, which is the current serving base station for UE 1302. In step 1202, source eNB 1304 generates and transmits signals 1203, e.g. broadcast reference signals, which are received and measured by UE 1302 in step 1204. In step 1205, target candidate eNB1 1308 generates and transmits signals 1206, e.g. broadcast reference signals, which are received and measured by UE 1302 in step 1207. In step 1208, target candidate eNB2 1310 generates and transmits signals 1206, e.g. broadcast reference signals, which are received and measured by UE 1302 in step 1207. In step 1211, additional eNB 1312 generates and transmits signals 1212, e.g. broadcast reference signals, which are received and measured by UE 1302 in step 1213.

In steps 1214 and 1214, the source eNB 1304 and UE 1302 communicate data transmission signals.

In step 1216, UE 1302 generates and sends measurement reports 1218, based on received and measured signals from the base stations (1304, 1308, 1310, 1312), e.g., individual reports corresponding to each of the base stations (1304, 1308, 1310, 1312). A report may be, and sometimes is, based on detected multiple iterations of a received signal. In step 1218, the source eNB 1304 receives the measurement reports and recovers the communicated information.

In step 1220 network management node 1306 generates and sends signals 1221 communicating base station loading information to source eNB 1304, which receives the signals and recovers the communicated base station loading information.

In step 1223 source eNB 1304 selects eNB1 1308 and eNB2 1312 as target candidates for conditional handover. In step 1224 the source eNB 1224 determines, e.g., based on target candidate eNB1 1308 loading information, UE reports regarding the source eNB 1304, UE reports regarding target candidate eNB1 1208, and/or other criteria, e.g., UE 1302 priority level and/or a type of data traffic being communicated by UE 1302, a first validity time and generates a first conditional handover request message including said determined first validity time, said first conditional handover request message to be send to target candidate eNB1 1308. In step 1225 the source eNB 1224 determines, e.g., based on target candidate eNB2 1310 loading information, UE reports regarding the source eNB 1304, UE reports regarding target candidate eNB2 1310, and/or other criteria, e.g., UE 1302 priority level and/or a type of data traffic being communicated by UE 1302, a second validity time and generates a second conditional handover request message including said determined second validity time, said second conditional handover request message to be send to target candidate eNB2 1310.

In step 1226 source eNB 1304 sends the first conditional handover request message 1227 including the first validity time 1228, to eNB1 1308, which is received by eNB1 1308 in step 1229. In step 1230, e.g. in response to receiving message 1227, eNB 1 1308 start a first validity timer, e.g., a countdown timer which is initialized to the first validity time 1228, allocates resources, e.g., including memory for storing context, and stores content corresponding to the UE 1302. In step 1231 eNB 1 1308 generates a sends a conditional handover response message 1232 to source eNB 1304, which is received by the source eNB 1304 in step 1233.

In step 1234 source eNB 1304 sends the second conditional handover request message 1235 including the second validity time 1236, to eNB2 1310, which is received by eNB2 1310 in step 1237. In step 1238, e.g. in response to receiving message 1235, eNB 2 1310 starts a second validity timer, e.g., a countdown timer which is initialized to the second validity time 1236, allocates resources, e.g., including memory for storing context, and stores content corresponding to the UE 1302. In step 1239 eNB 2 1310 generates a sends a conditional handover response message 1240 to source eNB 1304, which is received by the source eNB 1304 in step 1241.

In step 1242 source eNB 1204 generates and sends a conditional handover command 1243 to UE 1302 which is received in step 1244. In step 1245 UE 1202 determines, that a provided target threshold is met with regard to candidate eNB 1308, and UE 1302 decides to initiate handover to the target cell of eNB 1 1308.

In steps 1246 and steps 1247 UE 1302 and eNB1 1308 communicate synchronization and access signals 1248. In response to a received signal in signals 1247, eNB 1 1208 suspends the first validity timer, e.g. halts the countdown of the first validity timer.

In steps 1250 and 1251 UE 1302 generates and sends a RRC configuration complete message 1251 to eNB 1 1308 which is received by eNB 1 1308 in step 1252. In steps 1253 and 1253 and 1254, eNB 1 1308 and source eNB 1304 communicate notification of handover exchange signals 1255.

In step 1256, eNB 1 1308 determines that the handover is successful and eNB 1 1308 deletes the first validity timer.

In steps 1257 and 1258, the source eNB 1304 and eNB 1 1308, communicate data 1259 as part of data forwarding.

In step 1250 target candidate eNB 2 1310 determines that the second validity timer has expired. In step 1261, in response to determining that the second validity timer has expired, candidate target eNB 2 1310 releases resources allocated to the UE, which includes deleting stored UE context corresponding to the UE.

In steps 1262 and 1263, the source UE 1302 and eNB 1 1308, communicate data 1264 as part of data forwarding.

Various aspects and/or features of some embodiments of the present invention are further described below.

In some embodiments, a ConditionalHandoverValidity timer is introduced and used. In one exemplary embodiment, a novel X2-AP HANDOVER REQUEST message includes timer information provided by Source eNB to Target eNB(s) (eNB1 and eNB2), e.g., as per FIG. 12. Such timer information in milliseconds (ms) refers to time duration on: the target eNB for which it maintains context created after admission control for the given UE. The source eNB for which source eNB assumes the X2:HANDOVER REQUEST initiated for this UE to remain valid.

This time is called ConditionalHandoverValidity timer. Upon expiration of ConditionalHandoverValidity timer: i) the target eNB removes UE context for the given UE; and ii) the source eNB removes target eNB as a possible candidate for Conditional Handover for the given UE.

The source eNB sets the value of ConditionalHandoverValidity timer, e.g., using any of a number of different criteria. Non-limiting examples of such criteria include, e.g., EARFCN of target cell; NR-ARFCN of target cell; PCI of target cell; ECGI of target cell; supported RAT(s) in target cell; CSG identity, if broadcasted, of target cell; Rate of change of signal strengths (calculated from RSRQ, RSRP, and SINR over multiple time occasions) of source cell as reported by the UE in its measurement reports to the source eNB; Rate of change of signal strengths (calculated from RSRQ, RSRP, and SINR over multiple time occasions) of target cell as reported by the UE in its measurement reports to the source eNB; QCIs of ongoing DRBs for the UEs sessions; and UE's history information.

The source eNB can, and sometimes does, set different values of ConditionalHandoverValidity timer toward the same target nodes (and cells within the node) for different UEs. The source eNB can, and sometimes does, set different values of ConditionalHandoverValidity timer toward different target nodes (and cells within the node) for the same UE.

FIG. 13 includes exemplary tables 1350 and 1352 which are used to describe a novel information element, sometimes referred to as Conditional Handover Validity or Conditional Handover Validity Time, which may be, and sometimes is, included in a handover message, e.g., a novel conditional handover request message, in accordance with an exemplary embodiment. In some embodiments, the conditional handover validity time IE communicates a time in ms for which the Handover request including the conditional handover validity time IE is to remain valid to accept Conditional Handover form the UE identified in the message.

A novel Handover message in accordance with some exemplar y embodiments, includes: an Information Element (IE)/Group Name=ConditionalHandoverValidity; Presence=M (Mandatory); IE Type and Reference=INTEGER (1 . . . maxTimeforCHO Validity, . . . ). In some such embodiments, maxTimeforCHOValidity is a maximum time in ms for which Conditional Handover content context remains valid. In some embodiments the maximum value for maxTimeforCHOValidity is 10000. In some embodiments, a default value is not assumed.

In some embodiments, the IE ConditionalHandoverValidity is optional, e.g. Presence=O.

Various aspects of ConditionalHandoverValidity timer behavior, in some embodiments, will now be described. If the UE starts the conditional Handover (HO) to one of the target eNBs (where the admission control has for this UE was successfully executed), but the initial access (Contention Free Random Access (CFRA) procedure fails, then the target eNB shall freeze its ConditionalHandoverValidity timer, i.e., suspend the timer countdown process. This allows the UE to re-attempt conditional HO to its selected target eNB.

Note: The ConditionalHandoverValidity timer at the source eNB is not impacted due to the failed initial access procedure in the target cell. This is because information bout the target cell initial access procedure is not conveyed to the source cell. While additional signaling from UE to source cell to indicate the same could be designed, the benefits of doing so outweigh the implementation complexities.

The target eNB resumes the ConditionalHandoverValidity timer countdown with Y ms if it does not detect a PRACH (physical random access channel) preamble transmission with the PRACH mask specified by it, or does not detect a MsgA (for 2-step RACH) or Msg3 (for regular Contention Based Random Access (CBRA) or Contention Free Random Access (CFRA) transmission containing C-RNTI (Cell-Radio Network Temporary Identifier) of the UE for which resources have been reserved. A non-limiiting expaly of Y is a multiple of the gap between consecutive RACH (Random Access Channel) occasions as indicated by PRACH (Physical Random Access Channel) configuration index in RMSI (Remaining Minimum SI (System Information)).

Numbered List of Exemplary Method Embodiments

Method Embodiment 1

A communications method, the method comprising: determining (206) at a serving base station (e.g., a serving base station serving a first UE) a set of handoff targets for a first user equipment (UE) receiving service from the serving base station, said set of handoff targets including a first target base station; generating (210), at the serving base station, a first handoff message including a first validity time; and sending(228), from the serving base station, the first handoff message to said first target base station.

Method Embodiment 2

The method of Method Embodiment 1, wherein said first handoff message (identifying the first UE which may be handed off to the first handoff target upon a handoff condition being satisfied and including an address corresponding to the first target base station as a destination address) is a first conditional handoff message; and wherein said first validity time is a first amount of time (e.g., in milliseconds from an admission control operation triggered by the first handoff message) the first target base station is to maintain resources allocated to the first UE (e.g., UE context storage for the first UE) without the first UE completing a handoff to the first target base station.

Method Embodiment 3

The method of Method Embodiment 2, further comprising: receiving (230) at the first target base station the first handoff message; allocating(232) resources at the first target base station to the first UE; and starting (238) a first validity timer corresponding to the first UE, said first validity timer having a duration corresponding to the first validity time indicated in the first handoff message.

Method Embodiment 3A

The method of Method Embodiment 3, wherein allocating (232) resources at the first target base station to the first UE includes: allocating (234) memory for storing context corresponding to the first UE; and wherein the method further includes: storing (236) in memory at the first target base station context corresponding to the first UE. Also included in the allocation of resources to the first UE in some embodiments is the allocation of time-frequency resources for uplink transmissions by the first UE.

Method Embodiment 4

The method of Method Embodiment 3, further comprising: monitoring (242), at the first target base station for handoff signals from the first UE; and pausing (248) said first validity timer (e.g., halt a countdown of the first validity timer) in response to receiving a handoff signal from the first UE.

Method Embodiment 4A

The method of Method Embodiment 4, further comprising: prior to pausing (248) said first validity timer, receiving (246) a handoff signal from the first UE.

Method Embodiment 5

The method of Method Embodiment 4, further comprising: following pausing (248) of said first validity timer, operating (250) the first target base station to determine if handoff of the UE to the first target base station was successful or unsuccessful.

Method Embodiment 6

The method of Method Embodiment 5, further comprising: in response to determining that the handoff of the first UE to the first target base station was unsuccessful, resuming (256) a countdown of the first validity timer.

Method Embodiment 7

The method of Method Embodiment 5, further comprising, in response to determining that the handoff of the first UE to the first target base station was successful, deleting (254), at the first target base station, said first validity timer and operating (258) the first target base station to serve as a point of network attachment for the first UE.

Method Embodiment 8

The method of Method Embodiment 4, further comprising: checking (244), at the first target base station, to determine if said first validity timer has expired; and releasing (262) resources at said first target base station allocated to said first UE in response to determining that said first validity timer has expired.

Method Embodiment 8A

The method of Method Embodiment 8, wherein allocating (232) resources at the first target base station to the first UE includes allocating (234) memory for storing context corresponding to the first UE and, in some embodiments, time and frequency resources for uplink transmissions by the first UE; and wherein the method further includes storing (236) in memory at the first target base station context corresponding to the first UE; and wherein releasing (262) resources at said first target base station allocated to said first UE in response to determining that said first validity timer has expired includes deleting (263) the UE context for the first UE if said validity timer expires.

Method Embodiment 8AAA

The method of Method Embodiment 1, further comprising: operating (204) the serving base station to receive one or more (e.g., one, more or all) of: i) base station loading information from a network management device (SON device); ii) signal measurement reports from the first UE, or iii) traffic pending reports from the first UE providing traffic type information.

Method Embodiment 8B

The method of Method Embodiment 8AAA, wherein generating (210), at the serving base station, a first handoff message including a first validity timer includes: i) determining (212) a time duration to use as said first validity time based on one or more of: an EARFCN of the first target base station, a PCI of the first target base station, an ECGI of the first target base station, supported RAT(s) in the first target base station; a CSG Identity broadcast by the first target cell; an estimated load in first target cell (e.g., based on information provided by a SON), rate of change of signal strengths reported by the first UE with respect to the serving base station (e.g., calculated from RSRQ, RSRP and SINR over multiple time occasions of target BS as reported by the first UE in its Measurement Reports to the source base station); rate of change of signal strengths (e.g., calculated from RSRQ, RSRP and SINR over multiple time occasions) of first target cell as reported by the first UE in its Measurement Reports to the source base station, QCIs of ongoing DRBs for UEs sessions in which the first UE is involved; first UE History information, e.g., traffic type and/or traffic volume history information; and ii) including (214) said determined time duration as the first validity time in said first handoff message.

Method Embodiment 9

The method of embodiment 1, wherein generating (210), at the serving base station, a first handoff message including a first validity time includes: i) determining (216) a time duration to use as said first validity time based on one or more of: UE loading of said first target base station, a priority level of said first UE or a type of data traffic being communicated to or from the first UE; and ii) including (224) said determined time duration as the first validity time in said first handoff message.

Method Embodiment 9A

The method of Method Embodiment 9, wherein determining (216) a time duration to use as said first validity time includes determining (218) a first time duration when said first target base station is under a first load (e.g., traffic load or load in terms of the number of UEs being supported) and determining a second time duration when said first target base station is under a second load, said second being greater than said first load, said second time duration being shorter than the first time duration (use shorter timer for more heavily loaded BS so that reserved resources can freed up more quickly and allocated to another UE).

Method Embodiment 9A

The method of embodiment 9, wherein determining (216) a time duration to use as said first validity time includes determining (220) a first time duration when said first UE has a first priority level (e.g., high priority level) and determining a second time duration when said first UE has a second priority level which is lower than said first priority level, said second time duration being shorter than the first time duration (use shorter timer for lower priority devices).

Method Embodiment 9B

The method of Method Embodiment 9, wherein determining (210) a time duration to use as said first validity time includes determining (222) a first time duration when said first UE is communicating a first type of data traffic corresponding to a first traffic priority level (e.g., high priority voice traffic for a voice call) and determining a second time duration when said first UE is communicating a second type of data traffic corresponding to a second traffic priority level (e.g., low priority best effort data traffic) which is lower than said first traffic priority level, said second time duration being shorter than the first time duration (use shorter timer for lower data traffic).

Method Embodiment 10

The method of Method Embodiment 1, wherein determining (206) at a serving base station (e.g., a serving base station serving a first UE) a set of handoff targets for a first user equipment (UE) receiving service from the first base station, includes: selecting (208) as handoff targets at least said first target base station and a second target base station; and wherein the method further comprises: generating (264), at the serving base station, a second handoff message including a second validity time; and sending (281), from the serving base station, the second handoff message to said second target base station.

Method Embodiment 11

The method of Method Embodiment 10, wherein said second handoff message (identifying the first UE which may be handed off to the second handoff target upon a handoff condition being satisfied and including an address corresponding to the second target base station as a destination address) is a second conditional handoff message; and wherein said second validity time is a second amount of time (e.g., in milliseconds from an admission control operation triggered by the second handoff message) the second target base station is to maintain UE context for the first UE device without the first UE device completing a handoff to the second target base station.

Method Embodiment 12

The method of Method Embodiment 1, wherein generating (264), at the serving base station, a second handoff message including a second validity time includes: i) determining (270) a second time duration to use as said second validity time based on one or more of: UE loading of said second target base station, a priority level of said first UE or a type of data traffic being communicated to or from the first UE; and ii) including (278) said determined second time duration as the second validity time in said second handoff message.

Method Embodiment 13

The method of Method Embodiment 12, wherein said determined second time duration included as the second validity time in said second handoff message indicates a different time duration than said first validity time in said first handoff message.

Method Embodiment 14

The method of Method Embodiment 12, wherein said determined second time duration included in the second handoff message is the same as the determined time duration included in the first handoff message when said first and second target base stations are subject to the same loads as indicated by a message communicated to the serving base station by a network management device which monitors base station loading and provides base station load information to base stations.

Numbered List of Exemplary System Embodiments

System Embodiment 1

A communications system (100), the system comprising: a serving base station (102) including a first processor (302), said first processor configured to: determine at the serving base station (e.g., a serving base station serving a first UE) a set of handoff targets for a first user equipment (UE) (124) receiving service from the serving base station, said set of handoff targets including a first target base station (106); generate, at the serving base station, a first handoff message including a first validity time; and operate the serving base station to send, from the serving base station (102), the first handoff message to said first target base station.

System Embodiment 2

The communications system (100) of System Embodiment 1, wherein said first handoff message (identifying the first UE which may be handed off to the first handoff target upon a handoff condition being satisfied and including an address corresponding to the first target base station as a destination address) is a first conditional handoff message; and wherein said first validity time is a first amount of time (e.g, in milliseconds from an admission control operation triggered by the first handoff message) the first target base station is to maintain resources allocated to the first UE (e.g., UE context storage for the first UE) without the first UE completing a handoff to the first target base station.

System Embodiment 3

The communications system (100) of System Embodiment 2, further comprising said first target base station, said first target base station (106) including a second processor (502), said second processor configured to: operate the first target base station to receive the first handoff message; allocate resources at the first target base station to the first UE; and start a first validity timer corresponding to the first UE, said first validity timer having a duration corresponding to the first validity time indicated in the first handoff message.

System Embodiment 3A

The communications system (100) of System Embodiment 3, wherein said second processor is configured to: allocate memory for storing context corresponding to the first UE, as part of being configured to allocate resources at the first target base station to the first UE; and store in memory at the first target base station context corresponding to the first UE.

System Embodiment 4

The communications system (100) of System Embodiment 3, wherein said second processor is further configured to: operate the first target base station to monitor, at the first target base station for handoff signals from the first UE; and pause said first validity timer (e.g., halt a countdown of the first validity timer) in response to receiving a handoff signal from the first UE.

System Embodiment 4A

The communications system (100) of System Embodiment 4, wherein said second processor is further configured to: operate the first target base station to receive a handoff signal from the first UE, prior to pausing said first validity timer, System Embodiment 5

The communications system (100) of System Embodiment 4, wherein said second processor is further configured to: determine if handoff of the UE to the first target base station was successful or unsuccessful, following pausing of said first validity timer.

System Embodiment 6

The communications system (100) of System Embodiment 5, wherein said second processor is further configured to: resume a countdown of the first validity timer, in response to determining that the handoff of the first UE to the first target base station was unsuccessful.

System Embodiment 7

The communications system (100) of System Embodiment 5, wherein said second processor is configured to: delete, at the first target base station, said first validity timer and operate the first target base station to serve as a point of network attachment for the first UE, in response to determining that the handoff of the first UE to the first target base station was successful.

System Embodiment 8

The communications system (100) of System Embodiment 4, wherein said second processor is configured to: check, at the first target base station, to determine if said first validity timer has expired; and release resources at said first target base station allocated to said first UE in response to determining that said first validity timer has expired.

System Embodiment 8A

The communications system (100) of System Embodiment 8, wherein said second processor is configured to: allocate memory for storing context corresponding to the first UE, as part of being configured to allocate resources at the first target base station to the first UE; and store in memory at the first target base station context corresponding to the first UE; and delete the UE context for the first UE if said validity timer expires, as part of being configured to release resources at said first target base station allocated to said first UE in response to determining that said first validity timer has expired.

System Embodiment 8AAA

The communications system (100) of System Embodiment 1, wherein said first processor is further configured to: operate the serving base station to receive one or more (e.g., one, more or all) of: i) base station loading information from a network management device (SON device (122)); ii) signal measurement reports from the first UE, or iii) traffic pending reports from the first UE providing traffic type information.

System Embodiment 8B

The communications system (100) of System Embodiment 8AAA, wherein said first processor is configured to: i) determining a time duration to use as said first validity time based on one or more of: an EARFCN of the first target base station, a PCI of the first target base station, an ECGI of the first target base station, supported RAT(s) in the first target base station; a CSG Identity broadcast by the first target cell; an estimated load in first target cell (e.g., based on information provided by a SON), rate of change of signal strengths reported by the first UE with respect to the serving base station (e.g., calculated from RSRQ, RSRP and SINR over multiple time occasions of target BS as reported by the first UE in its Measurement Reports to the source base station); rate of change of signal strengths (e.g., calculated from RSRQ, RSRP and SINR over multiple time occasions) of first target cell as reported by the first UE in its Measurement Reports to the source base station, QCIs of ongoing DRBs for UEs sessions in which the first UE is involved; first UE History information, e.g., traffic type and/or traffic volume history information; and ii) include said determined time duration as the first validity time in said first handoff message, as part of being configured to generate, at the serving base station, a first handoff message including a first validity time.

System Embodiment 9

The communications system (100) of System Embodiment 1, wherein said first processor is configured to: i) determine a time duration to use as said first validity time based on one or more of: UE loading of said first target base station, a priority level of said first UE or a type of data traffic being communicated to or from the first UE; and ii) include said determined time duration as the first validity time in said first handoff message, as part of being configured to generate, at the serving base station, a first handoff message including a first validity time.

System Embodiment 9A

The communications system (100) of System Embodiment 9, wherein said first processor is configured to determine a first time duration when said first target base station is under a first load (e.g., traffic load or load in terms of the number of UEs being supported) and determining a second time duration when said first target base station is under a second load, said second being greater than said first load, said second time duration being shorter than the first time duration (use shorter timer for more heavily loaded BS so that reserved resources can freed up more quickly and allocated to another UE), as part of being configured to determine a time duration to use as said first validity time includes.

System Embodiment 9A

The communications system (100) of System Embodiment 9, wherein said first processor is configured to: determine a first time duration when said first UE has a first priority level (e.g., high priority level) and determining a second time duration when said first UE has a second priority level which is lower than said first priority level, said second time duration being shorter than the first time duration (use shorter timer for lower priority devices), as part of being configured to determine a time duration to use as said first validity time.

System Embodiment 9B

The communications system (100) of System Embodiment 9, wherein said first processor is configured to: determine a first time duration when said first UE is communicating a first type of data traffic corresponding to a first traffic priority level (e.g., high priority voice traffic for a voice call) and determining a second time duration when said first UE is communicating a second type of data traffic corresponding to a second traffic priority level (e.g., low priority best effort data traffic) which is lower than said first traffic priority level, said second time duration being shorter than the first time duration (use shorter timer for lower data traffic), as part of being configured to determine a time duration to use as said first validity time.

System Embodiment 10

The communications system (100) of System Embodiment 1, wherein said first processor is configured to: select as handoff targets at least said first target base station (106) and a second target base station (108), as part of being configured to determine at a serving base station (e.g., a serving base station serving a first UE) a set of handoff targets for a first user equipment (UE) receiving service from the first base station; and generate, at the serving base station, a second handoff message including a second validity time; and operate the serving base station to send, from the serving base station, the second handoff message to said second target base station.

System Embodiment 11

The communications system (100) of System Embodiment 10, wherein said second handoff message (identifying the first UE which may be handed off to the second handoff target upon a handoff condition being satisfied and including an address corresponding to the second target base station as a destination address) is a second conditional handoff message; and wherein said second validity time is a second amount of time (e.g., in milliseconds from an admission control operation triggered by the second handoff message) the second target base station is to maintain UE context for the first UE device without the first UE device completing a handoff to the second target base station.

System Embodiment 12

The communications system (100) of System Embodiment 1, wherein said first processor is configured to: i) determine a second time duration to use as said second validity time based on one or more of: UE loading of said second target base station, a priority level of said first UE or a type of data traffic being communicated to or from the first UE; and ii) include said determined second time duration as the second validity time in said second handoff message, as part of being configured to generate, at the serving base station, a second handoff message including a second validity time.

System Embodiment 13

The communications system (100) of System Embodiment 12, wherein said determined second time duration included as the second validity time in said second handoff message indicates a different time duration than said first validity time in said first handoff message.

System Embodiment 14

The communications system (100) of System Embodiment 12, wherein said determined second time duration included in the second handoff message is the same as the determined time duration included in the first handoff message when said first and second target base stations are subject to the same loads as indicated by a message communicated to the serving base station by a network management device which monitors base station loading and provides base station load information to base stations.

Some features are directed to a non-transitory computer readable medium (310) including a first set of computer executable instructions which when executed by a processor (302) of a serving base station (102) cause the serving base station (102) to perform the steps of: determining (206) at the serving base station (e.g., a serving base station serving a first UE) a set of handoff targets for a first user equipment (UE) receiving service from the serving base station, said set of handoff targets including a first target base station; generating (210), at the serving base station, a first handoff message including a first validity time; and sending (228), from the serving base station, the first handoff message to said first target base station.

The techniques of various embodiments may be implemented using software, hardware and/or a combination of software and hardware. Various embodiments are directed to apparatus, e.g., user devices such as a user equipment (UE) device, base stations such as a eNB, gNB or ng-eNB, large cell base station, small cell base stations, femto cell base stations, pico cell base stations, network nodes, an AMF device, core network nodes, a network management node, a SON node, servers, customer premises equipment devices, cable systems, network nodes, gateways, cable headend/hubsites, network monitoring node/servers, cluster controllers, cloud nodes, production nodes, cloud services servers and/or network equipment devices. Various embodiments are also directed to methods, e.g., method of controlling and/or operating user devices, base stations, gateways, servers, cable networks, cloud networks, nodes, servers, cloud service servers, customer premises equipment devices, controllers, network monitoring nodes/servers and/or cable or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., communications nodes such as controllers are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a cluster controller including, with a processor which includes a component corresponding to each of the steps of the various described methods performed by the device in which the processor is included. In some but not all embodiments a device, e.g., communications node such as a controller, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a controller or other device described in the present application. In some embodiments components are implemented as hardware devices in such embodiments the components are hardware components. In other embodiments components may be implemented as software, e.g., a set of processor or computer executable instructions. Depending on the embodiment the components maybe all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method, the method comprising:
   determining at a serving base station a set of handoff targets for a first user equipment (UE) receiving service from the serving base station, said set of handoff targets including both a first target base station and a second target base station;
   determining a first validity time based on information corresponding to the first target base station, said information corresponding to the first target base station including first target base station loading information;
   determining a second validity time based on information corresponding to the second target base station, said information corresponding to the second target base station including second target base station loading information, said first target base station being more heavily loaded than said second target base station, the first validity time being shorter than the second validity time;
   generating, at the serving base station, a first handoff message including the first validity time;
   generating, at the serving base station, a second handoff message including the second validity time;
   sending, from the serving base station, the first handoff message to said first target base station; and
   sending, from the serving base station, the second handoff message to said second target base station.

2. The method of claim 1,
   wherein said first handoff message is a first conditional handoff message;
   wherein said first validity time is a first amount of time the first target base station is to maintain resources allocated to the first UE without the first UE completing a handoff to the first target base station;
   wherein said second handoff message is a second conditional handoff message; and
   wherein said second validity time is a second amount of time the second target base station is to maintain resources allocated to the first UE without the first UE completing a handoff to the second target base station.

3. The method of claim 2, further comprising:
   receiving at the first target base station the first handoff message;
   allocating resources at the first target base station to the first UE; and
   starting a first validity timer corresponding to the first UE, said first validity timer having a duration corresponding to the first validity time indicated in the first handoff message.

4. The method of claim 3, further comprising:
   monitoring, at the first target base station for handoff signals from the first UE; and
   pausing said first validity timer in response to receiving a handoff signal from the first UE.

5. The method of claim 4, further comprising:
   following pausing of said first validity timer, operating the first target base station to determine if handoff of the first UE to the first target base station was successful or unsuccessful.

6. The method of claim 5, further comprising:
in response to determining that the handoff of the first UE to the first target base station was unsuccessful, resuming a countdown of the first validity timer.

7. The method of claim 5, further comprising
in response to determining that the handoff of the first UE to the first target base station was successful, deleting, at the first target base station, said first validity timer and operating the first target base station to serve as a point of network attachment for the first UE.

8. The method of claim 4, further comprising:
checking, at the first target base station, to determine if said first validity timer has expired; and
releasing resources at said first target base station allocated to said first UE in response to determining that said first validity timer has expired.

9. The method of claim 1, wherein determining a first validity time based on information corresponding to the first target base station includes
determining a time duration to use as said first validity time based on one or more of: UE loading of said first target base station, a priority level of said first UE or a type of data traffic being communicated to or from the first UE.

10. The method of claim 1, wherein determining a second validity time based on information corresponding to the second target base station includes determining a second time duration to use as said second validity time based on one or more of: UE loading of said second target base station, a priority level of said first UE or a type of data traffic being communicated to or from the first UE.

11. A communications system, the system comprising:
a serving base station including a first processor, said first processor configured to:
determine at the serving base station a set of handoff targets for a first user equipment (UE) receiving service from the serving base station, said set of handoff targets including both a first target base station and a second target base station;
determine a first validity time based on information corresponding to the first target base station, said information corresponding to the first target base station including first target base station loading information;
determine a second validity time based on information corresponding to the second target base station, said information corresponding to the second target base station including second target base station loading information, said first target base station being more heavily loaded than said second target base station, the first validity time being shorter than the second validity time;
generate, at the serving base station, a first handoff message including the first validity time;
generate, at the serving base station, a second handoff message including the second validity time;
operate the serving base station to send, from the serving base station, the first handoff message to said first target base station; and
operate the serving base station to send, from the serving base station, the second handoff message to said second target base station.

12. The communications system of claim 11,
wherein said first handoff message is a first conditional handoff message;
wherein said first validity time is a first amount of time the first target base station is to maintain resources allocated to the first UE without the first UE completing a handoff to the first target base station;
wherein said second handoff message is a second conditional handoff message; and
wherein said second validity time is a second amount of time the second target base station is to maintain resources allocated to the first UE without the first UE completing a handoff to the second target base station.

13. The communications system of claim 12,
wherein the communications system further comprises said first target base station, said first target base station including a second processor, said second processor configured to:
operate the first target base station to receive the first handoff message;
allocate resources at the first target base station to the first UE; and
start a first validity timer corresponding to the first UE, said first validity timer having a duration corresponding to the first validity time indicated in the first handoff message.

14. The communications system of claim 13,
wherein said second processor is further configured to:
operate the first target base station to monitor, at the first target base station for handoff signals from the first UE; and
pause said first validity timer in response to receiving a handoff signal from the first UE.

15. The communications system of claim 14, wherein said second processor is further configured to:
determine if handoff of the UE to the first target base station was successful or unsuccessful, following pausing of said first validity timer; and
resume a countdown of the first validity timer, in response to determining that the handoff of the first UE to the first target base station was unsuccessful.

16. A non-transitory computer readable medium including a first set of computer executable instructions which when executed by a processor of a serving base station cause the serving base station to perform the steps of:
determining at the serving base station a set of handoff targets for a first user equipment (UE) receiving service from the serving base station, said set of handoff targets including both a first target base station and a second target base station;
determining a first validity time based on information corresponding to the first target base station, said information corresponding to the first target base station including first target base station loading information;
determining a second validity time based on information corresponding to the second target base station, said information corresponding to the second target base station including second target base station loading information, said first target base station being more heavily loaded than said second target base station, the first validity time being shorter than the second validity time;
generating, at the serving base station, a first handoff message including the first validity time;
generating, at the serving base station, a second handoff message including the second validity time;
sending, from the serving base station, the first handoff message to said first target base station; and sending, from the serving base station, the second handoff message to said second target base station.

* * * * *